(12) United States Patent
Lee et al.

(10) Patent No.: US 12,495,357 B2
(45) Date of Patent: Dec. 9, 2025

(54) METHOD AND APPARATUS FOR MANAGING REGISTRATION OF NETWORK SLICE IN WIRELESS COMMUNICATION SYSTEM

(71) Applicant: SAMSUNG ELECTRONICS CO., LTD., Suwon-si (KR)

(72) Inventors: Hoyeon Lee, Suwon-si (KR); Dongeun Suh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 468 days.

(21) Appl. No.: 18/045,132

(22) Filed: Oct. 7, 2022

(65) Prior Publication Data

US 2023/0109814 A1 Apr. 13, 2023

(30) Foreign Application Priority Data

Oct. 8, 2021 (KR) .................. 10-2021-0134458
Oct. 14, 2021 (KR) .................. 10-2021-0136862
(Continued)

(51) Int. Cl.
*H04W 48/18* (2009.01)
*H04W 48/16* (2009.01)
*H04W 60/00* (2009.01)

(52) U.S. Cl.
CPC ........... *H04W 48/18* (2013.01); *H04W 48/16* (2013.01); *H04W 60/005* (2013.01)

(58) Field of Classification Search
CPC .... H04W 48/16; H04W 48/18; H04W 60/005
See application file for complete search history.

(56) References Cited

U.S. PATENT DOCUMENTS

2020/0337050 A1  10/2020  Mildh
2021/0037426 A1  2/2021  Zhu et al.
(Continued)

FOREIGN PATENT DOCUMENTS

WO  2018/184656 A1  10/2018
WO  2018/215076 A1  11/2018
(Continued)

OTHER PUBLICATIONS

Supplementary European Search Report dated Nov. 27, 2024, in connection with European Patent Application No. 22878985.5, 12 pages.

(Continued)

*Primary Examiner* — Wayne H Cai

(57) ABSTRACT

A method performed by an access and mobility management function (AMF) in a wireless communication system may include: transmitting, to a network slice admission control function (NSACF), a request message for a slice availability check including information regarding an access type of a user equipment (UE), based on a registration request of the UE for one or more single network slice selection assistance information (S-NSSAI); in case that the slice availability check is performed for the one or more S-NSSAIs at the NSACF, based on the access type of the UE, receiving a response message including information regarding a result of the slice availability check, from the NSACF; and transmitting a registration response for the one or more S-NSSAIs to the UE, based on the response message.

10 Claims, 24 Drawing Sheets

(30) Foreign Application Priority Data

Oct. 19, 2021 (KR) ........................ 10-2021-0139153
Oct. 25, 2021 (KR) ........................ 10-2021-0142629

(56) References Cited

U.S. PATENT DOCUMENTS

2021/0368421 A1* 11/2021 Venkataraman ...... H04W 76/11
2024/0236912 A1* 7/2024 Velev .................... H04W 60/04
2024/0406854 A1* 12/2024 Velev .................... H04W 28/20

FOREIGN PATENT DOCUMENTS

WO 2022211424 A1 10/2022
WO 2023275820 A1 1/2023

OTHER PUBLICATIONS

Kumar et al., "System And Methods For User Equipment Strong Rejected Network Slice Selection Assistance Information Per Access Type," India Patent Application No. IN202141034003, filed Jul. 28, 2021, 20 pages.

"3rd Generation Partnership Project; Technical Specification Group Services and System Aspects; Procedures for the 5G System (5GS); Stage 2 (Release 17)", 3GPP TS 23.502 V17.2.1 (Sep. 2021), 705 pages.

International Search Report and Written Opinion of the International Searching Authority dated Jan. 12, 2023 in connection with International Patent Application No. PCT/KR2022/015221, 9 pages.

Notice of Reason for Refusal dated Mar. 11, 2025 corresponding to JP Application No. 2024-521131, 16 pages.

LG Electronics, "Resolving the editor's note on session continuity in EPC Interworking scenario (Alternative 1)", 3GPP TSG-SA WG2 Meeting #146E (e-meeting), S2-2105488, Aug. 2021, 7 pages.

Huawei, et al., "NSAC for priority services", 3GPP TSG-WG SA2 Meeting #146E e-meeting, S2-2106155, Aug. 2021, 7 pages.

NEC, "TS23 502 Correction to the NSAC to maintain service continuity", 3GPP TSG-SA WG2 Meeting #146E e-meeting, S2-2106662, Aug. 2021, 13 pages.

"3rd Generation Partnership Project; Technical Specification Group Services and System Aspects; System architecture for the 5G System (5GS); Stage 2 (Release 17)," 3GPP TS 23.501 V17.2.0, Sep. 2021, 542 pages.

Office Action dated Jul. 22, 2025, in connection with Japanese Application No. 2024-521131, 6 pages.

* cited by examiner

METHOD AND APPARATUS FOR MANAGING REGISTRATION OF NETWORK SLICE IN WIRELESS COMMUNICATION SYSTEM

CROSS-REFERENCE TO RELATED APPLICATIONS

This application is based on and claims priority under 35 U.S.C. § 119 to Korean Patent Application No. 10-2021-0134458, filed on Oct. 8, 2021, Korean Patent Application No. 10-2021-0136862, filed on Oct. 14, 2021, Korean Patent Application No. 10-2021-0139153, filed on Oct. 19, 2021, and Korean Patent Application No. 10-2021-0142629, filed on Oct. 25, 2021, in the Korean Intellectual Property Office, the disclosures of which are incorporated by reference herein in their entirety.

BACKGROUND

1. Field

The disclosure relates to a method and apparatus for managing registration of a network slice in a wireless communication system. The disclosure also relates to a wireless communication system, and more particularly, to a method and apparatus for providing an exemption service in a wireless communication system. The disclosure also relates to a wireless communication system, and more particularly, to a method and apparatus for providing an exemption service in a wireless communication system.

2. Description of the Related Art

Considering the development of wireless communication from generation to generation, the technologies have been developed mainly for services targeting humans, such as voice calls, multimedia services, data services, and the like. Following the commercialization of $5^{th}$ generation (5G) communication systems, it is expected that connected devices being exponentially growing will be connected to communication networks. Examples of things connected to networks may include vehicles, robots, drones, home appliances, displays, smart sensors connected to various infrastructures, construction machines, factory equipment, and the like. Mobile devices are expected to evolve in various form-factors such as augmented reality glasses, virtual reality headsets, hologram devices, and the like. In order to provide various services by connecting hundreds of billions of devices and things in the $6^{th}$ generation (6G) era, there have been ongoing efforts to develop enhanced 6G communication systems. For these reasons, 6G communication systems are referred to as beyond-5G systems.

6G communication systems, which are expected to be commercialized around 2030, will have a peak data rate of tera (i.e., 1,000 giga)-level bps and radio latency less than 100 μsec. That is, the 6G communication systems will be 50 times as fast as 5G communication systems and have the $\frac{1}{10}$ radio latency thereof.

In order to achieve such a high data rate and ultra-low latency, it has been considered to implement the 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance, that is, coverage, will become more important. It is necessary to develop, as major technologies for securing the coverage, radio frequency (RF) elements, antennas, novel waveforms having better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, in order to improve the coverage of terahertz-band signals, there has been ongoing discussion on new technologies such as metamaterial-based lenses and antennas, a high-dimensional spatial multiplexing technology using orbital angular momentum (OAM), reconfigurable intelligent surface (RIS), and the like.

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for using satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by using AI in a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in the 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of the 6G communication systems in hyper-connectivity, including person to machine (P2M) as well as machine to machine (M2M), will allow the next hyper-connected experience. In more detail, it is expected that services such as truly immersive extended reality (XR), high-fidelity mobile hologram, and digital replica could be provided through the 6G communication systems. In addition, services such as remote surgery for security and reliability enhancement, industrial automation, and emergency response will be provided through the 6G communication system, such that the technologies could be applied in various fields such as industry, medical care, automobiles, home appliances, and the like.

SUMMARY

Embodiments of the disclosure related to a technology for managing registration of a network slice in a wireless communication system.

Additional aspects will be set forth in part in the description which follows and, in part, will be apparent from the description, or may be learned by practice of the presented embodiments of the disclosure.

According to an embodiment of the disclosure, a method performed by an access and mobility management function (AMF) in a wireless communication system includes: transmitting, to a network slice admission control function (NSACF), a request message for a slice availability check including information regarding an access type of a user equipment (UE), based on a registration request of the UE for one or more single network slice selection assistance information (S-NSSAI); in case that the slice availability check is performed for the one or more S-NSSAIs at the NSACF, based on the access type of the UE and configuration of the NSACF, receiving a response message including information regarding a result of the slice availability check, from the NSACF; and transmitting a registration response for the one or more S-NSSAIs to the UE, based on the response message.

According to an embodiment of the disclosure, a method performed by a network slice admission control function (NSACF) in a wireless communication system includes: receiving, from an access and mobility management function (AMF), a request message for a slice availability check including information regarding an access type of a user equipment (UE), based on a registration request of the UE for one or more single network slice selection assistance information (S-NSSAI); performing a slice availability check for the one or more S-NSSAIs, based on the access type of the UE and configuration of the MACE; and transmitting a response message including information regarding a result of the slice availability check, to the AMF, and wherein a registration response for the one or more S-NSSAIs is transmitted from the AMF to the UE, based on the response message.

According to an embodiment of the disclosure, an access and mobility management function (AMF) in a wireless communication system includes: a transceiver; and at least one processor coupled with the transceiver and configured to: transmit, to a network slice admission control function (NSACF), a request message for a slice availability check including information regarding an access type of a user equipment (UE), based on a registration request of the UE for one or more single network slice selection assistance information (S-NSSAI), in case that the slice availability check is performed for the one or more S-NSSAIs at the NSACF, based on the access type of the UE and configuration of the NSACF, receive a response message including information regarding a result of the slice availability check, from the NSACF, and transmit a registration response for the one or more S-NSSAIs to the UE, based on the response message.

According to an embodiment of the disclosure, a network slice admission control function (NSACF) in a wireless communication system includes: a transceiver; and at least one processor coupled with the transceiver and configured to: receive, from an access and mobility management function (AMF), a request message for a slice availability check including information regarding an access type of a user equipment (UE), based on a registration request of the UE for one or more single network slice selection assistance information (S-NSSAI), perform a slice availability check for the one or more S-NSSAIs, based on the access type of the UE and configuration of the NSACF, and transmit a response message including information regarding a result of the slice availability check, to the AMF, and wherein a registration response for the one or more S-NSSAIs is transmitted from the AMF to the UE, based on the response message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

Hereinafter, the disclosure relates to a method and apparatus for supporting various services in a wireless communication system. In particular, the disclosure relates to a technology for supporting various services by managing registration of a user equipment (UE) attempting to use a network slice in a wireless communication system.

Hereinafter, terms identifying an access node, terms indicating network entities or network functions (NFs), terms indicating messages, terms indicating an interface between network entities, and terms indicating various pieces of identification information, as used in the following descriptions, are exemplified for convenience descriptions. Therefore, a network slice registration method according to the disclosure is not limited to terms to be described below, and other terms indicating objects having equal technical meanings may be used.

Hereinafter, for convenience of descriptions, some terms and names defined in the 3$^{rd}$ generation partnership project long term evolution (3GPP LTE) and 5G standard may be used. However, the disclosure is not limited to these terms and names, and may be equally applied to systems conforming to other standards.

Hereinafter, for convenience of descriptions, entities that exchange information for access control and state management will now be described by using names (e.g., an access and mobility management function (AMF), a session management function (SMF), a network slice selection function (NSSF), or the like) of NFs. However, embodiments of the disclosure may be equally applied to a case where NFs are actually implemented as instances (an AMF instance, an SMF instance, an NSSF instance, or the like).

In order to support various services in various network structures, a network slicing technology has been introduced. The network slicing refers to a technology for logically configuring a network with a set of NFs to support a particular service, and separating slice from other slice configuring a network with a set of NFs to support another service. When one UE receives various services, the UE may access two or more slices.

Figure 1:
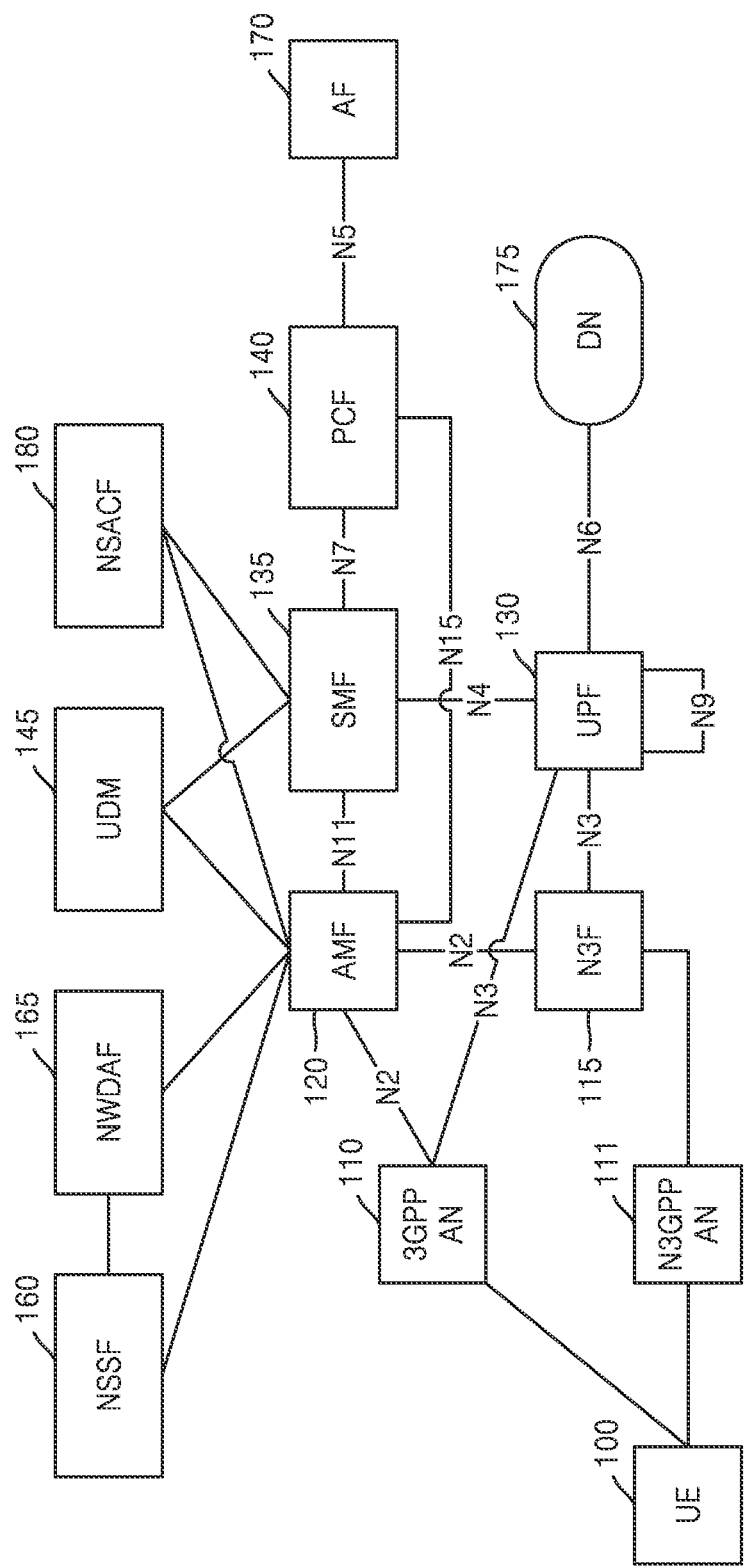
FIG. 1 illustrates a system structure of a $5^{th}$ generation system (5GS) according to an embodiment of the present disclosure.

FIG. 1 illustrates a system structure of a 5GS according to an embodiment of the present disclosure.

The 5GS may be configured with a 5G core network, a BS, a UE, or the like. The 5G core network may be configured of an AMF 120, an SMF 135, a user plane function (UPF) 130, a policy control function (PCF) 140, unified data management (UDM) 145, an NSSF 160, a network data analytics function (NWDAF) 165, a non-3GPP Function (N3F) 115, or the like.

A UE 100 may access the 5G core network via a 3GPP radio access network BS 110 (also referred to as the BS 110) and a non-3GPP access network 111. Via the BS 110, the UE 100 may be connected to the AMF 120 with an N2 interface and may be connected to the UPF 130 with an N3 interface. The 3GPP AN 110 may also be referred to as a base station (BS), an access point (AP), eNodeB (eNB), 5G node, gNodeB (gNB), or another term having same technical meaning. The N3F 115 is an NF that operates as termination of N2 interface and N3 interface for the UE 100 accessing via the non-3GPP access network 111 (e.g., WiFi) not defined in the 3GPP. The N3F 115 may process N2 control plane signaling and N3 user plane packet. The UE 100 connected to the N3F 115 via the non-3GPP access network 111 may be connected to the AMF 120 with N2 interface and connected to the UPF 130 with N3 interface via the N3F 115. The N3F 115 may include a Non-3GPP interworking function (N3IWF), a trusted Non-3GPP gateway function (TNGF), or the like.

The AMF 120 is an NF that manages wireless network access and mobility with respect to a UE. The SMF 135 is an NF managing a session with respect to a UE, and session information may include quality of service (QoS) information, charging information, packet processing information, or the like. The UPF 130 is an NF processing user plane traffic and is controlled by the SMF 135. The PCF 140 is an NF that manages an operator policy for providing a service in a wireless communication system.

The UDM 145 is an NF that stores and manages UE subscription. A unified data repository (UDR) 150 is an NF that stores and manages data. The UDR 150 may store UE subscription information and may provide the UE subscription information to the UDM 145. Also, the UDR 150 may store operator policy information and may provide the operator policy information to the PCF 140.

An NWDAF 165 is an NF that provides analysis information with which a 5G system can operate. The NWDAF 165 may collect data from other NF through operation, administration, and maintenance (OAM) which configure the 5G system, may analyze the collected data, and may provide a result of the analysis to the other NF. A network slice admission control function (NSACF) 180 is an NF that monitors and controls the number of registered UEs and the number of sessions of a network slice that is a target of network slice admission control (NSAC). The NSACF 180 stores configuration information about a maximum number of registered UEs and a maximum number of sessions per network slice.

Hereinafter, for convenience of descriptions, entities that exchange information for access control and state management are collectively referred to as an NF. However, embodiments of the disclosure may be equally applied to a case where NFs are actually implemented as instances (an AMF instance, an SMF instance, an NSSF instance, or the like).

In the present disclosure, an instance may indicate that a particular NF exists in the form of software code and is executable by receiving allocation of physical and/or logical resources from a particular computing system so as to perform a function of the NF in the computing system existing in a physical computing system, e.g., a core network. Therefore, AMF Instance, SMF Instance, and NSSF Instance may indicate that the AMF Instance, the SMF Instance, and the NSSF Instance are executable by receiving allocation of physical and/or logical resources for AMF, SW, and NSSF operations, respectively, from a particular computing system existing over a core network. As a result, physical AMF, SMF, and NSSF entities, and the AMF Instance, the SMF Instance, and the NSSF Instance which are allocated and use physical and/or logical resources for AMF, SMF, and NSSF operations from a particular computing system existing over a network may perform same operations. Therefore, in an embodiment of the disclosure, features described for an NF (AMF, SMF, UPF, NSSF, NRF, SCP, or the like) may be replaced by an NF instance, or inversely, features described for an NF instance may be replaced by and applied for an NF. Equally, in an embodiment of the disclosure, features described for a network slice may be replaced by a network slice instance, or inversely, features described for a network slice instance may be replaced by and applied for a network slice.

According to an embodiment of the disclosure, in the 5G system defined in the 3GPP, a single network slice may be referred to as single-network slice selection assistance information (S-NSSAI). The S-NSSAI may consist of a value of a slice/service type (SST) and a value of a slice differentiator (SD). The SST may indicate a feature of a service (e.g., enhanced mobile broadband (eMBB), Internet of things (IoT), ultra-reliable and low-latency communications (URLLC), vehicle-to-everything (V2X), etc.) supported by a slice. The value of the SD may refer to a value to be used as an additional identifier with respect to a particular service indicated by the SST.

NSSAI may include one or more S-NSSAIs. Examples of the NSSAI may include, but are not limited to, Configured NSSAI stored in a UE, requested NSSAI requested by a UE, allowed NSSAI allowed for usage by a UE that is determined by an NF (e.g., an AMF, an NSSF, etc.) of a 5G core network, and subscribed NSSAI to which a UE subscribes.

The UE 100 may be simultaneously connected to the 3GPP radio access network BS 110 and the non-3GPP access network 111 and thus may be registered in the 5G system. In particular, the UE 100 may perform a registration procedure with the AMF 120 by accessing the 3GPP radio access network BS 110. In the registration procedure, the AMF 120 may determine and allocate allowed NSSAI to the UE 100, the allowed NSSAI being usable by the UE 100 accessing the 3GPP radio access network BS 110. The allowed NSSAI is referred to as a first allowed slice. The UE 100 may perform a registration procedure with the AMF 120 via the N3F 115 by accessing the non-3GPP access network 111. In the registration procedure, the AMF 120 may determine and allocate allowed NSSAI to the UE 100, the allowed NSSAI being usable by the UE 100 accessing the non-3GPP access network 111. The allowed NSSAI is referred to as a second allowed slice. The first allowed NSSAI and the second allowed NSSAI may include the same S-NSSAI or different allowed S-NSSAIs.

Figure 2:
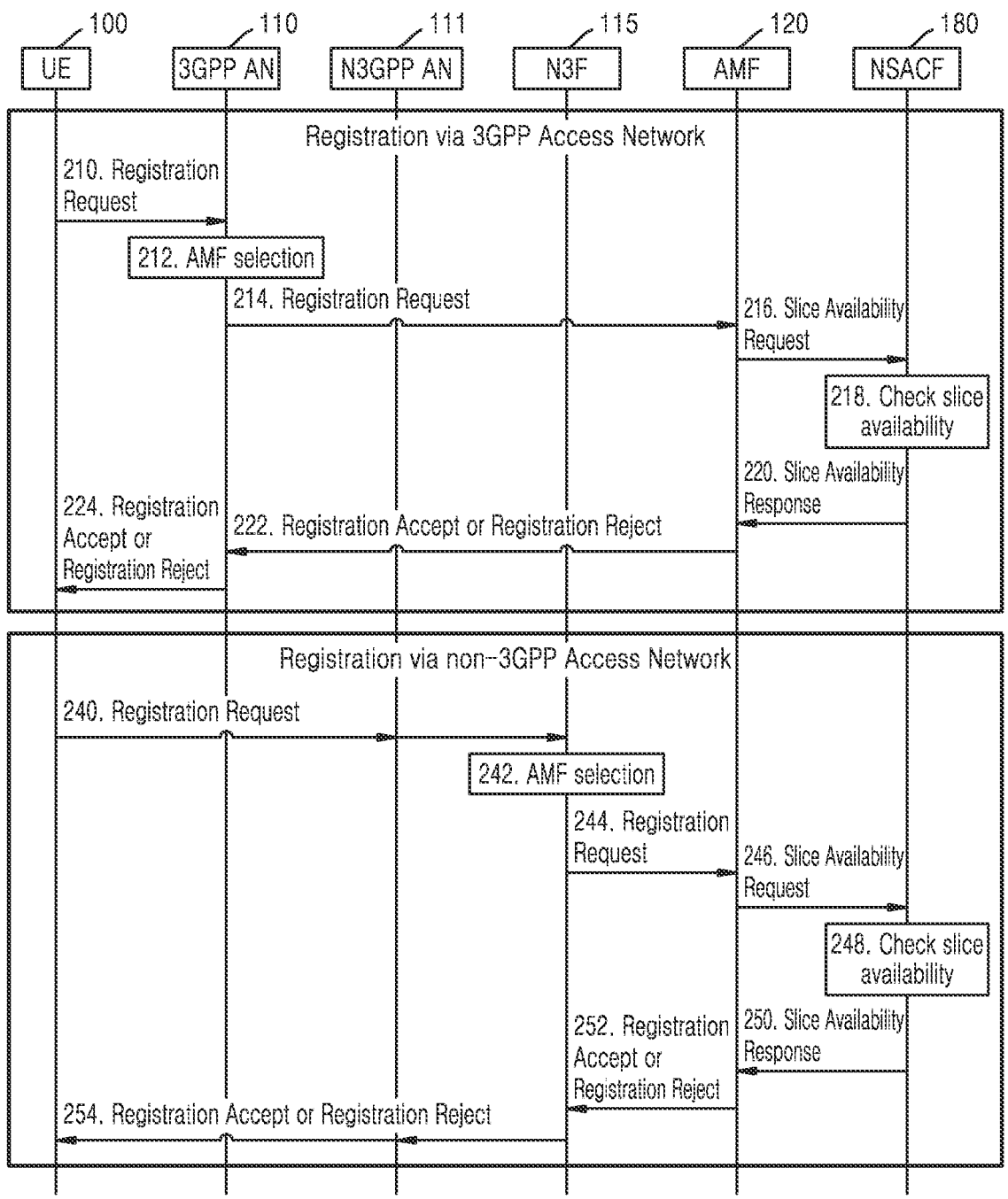
FIG. 2 illustrates a user equipment (UE) registration procedure according to an embodiment of the present disclosure.

FIG. 2 illustrates a UE registration procedure according to an embodiment of the present disclosure.

Referring to FIG. 2, the UE 100 according to an embodiment of the disclosure may perform a registration procedure with the AMF 120 by accessing the 3GPP radio access network BS 110 and the non-3GPP access network 111. In descriptions of embodiments of the disclosure, an access network and an access type may be interchangeably used.

For convenience of descriptions, a network slice registration management method according to an embodiment of the disclosure is described with an example of a UE registration procedure, but embodiments of the disclosure may be applied not only to the UE registration procedure but also applied to other UE-initiated procedures. For example, the other UE-initiated procedures may include UE-initiated deregistration, network slice specific authentication and authorization (NSSAA) during UE registration, or the like, however, they are merely examples, and thus, embodiments of the disclosure may be applied to any UE-initiated procedure.

Operation 210: The UE 100 may access the 3GPP radio access network BS 110 and then may transmit a registration request message. The registration request message may include information about requested NSSAI (e.g., S-NSSAI A) the UE 100 attempts to use.

Operation 212: According to an embodiment of the disclosure, when the BS 110 receives the registration request message, the BS 110 may select the AMF 120 to which the registration request is to be transmitted, based on the requested NSSAI received from the UE 100. For example, the BS 110 may select the AMF 120 capable of supporting the requested NSSAI.

Operation 214: The BS 110 may transmit the registration request message to the AMF 120 selected in operation 212. The AMF 120 may determine an allowed slice (allowed NSSAI) to be applied to a 3GPP access network (which transmitted the registration request message in operation 214) to which the UE 100 currently accesses, based on the requested NSSAI, subscribed S-NSSAI, a 3GPP access network, and an operator policy which are related to the UE 100. For example, the AMF 120 may include the UE-requested slice (e.g., S-NSSAI A) in an allowed slice (e.g., S-NSSAI A).

Operation 216: The AMF 120 may determine whether S-NSSAI included in the allowed slice is S-NSSAI that is a target of NSAC, based on configuration information stored in the AMF 120. For example, the configuration information may include information indicating which S-NSSAI is a target of NSAC, information indicating whether S-NSSAI that is a target of NSAC is a target of EPC counting, information indicating whether S-NSSAI that is a target of NSAC is a target of 5GC counting, and information indicating which access type (e.g., 3GPP access, Non-3GPP access, both 3GPP access and Non-3GPP access, or the like) is a target of NSAC for S-NSSAI. Also, the AMF 120 may determine, based on the configuration information, whether an access type (i.e., an access type used in request message transmission by the UE 100) of the BS 110 to which the UE 100 currently accesses is an access type that is a target of NSAC for S-NSSAI.

When S-NSSAI included in the allowed slice is S-NSSAI that is a target of NSAC, the AMF 120 may check slice availability with the NSACF 180 of the 5G core network before the AMF 120 determines to allow the allowed slice for the UE 100. To this end, the AMF 120 may transmit a slice availability request message to the NSACF 180. The slice availability request message may include at least one of information about an NSAC-target slice (e.g., S-NSSAI(s), requested NSSAI, allowed NSSAI, subscribed S-NSSAI, or the like), information about an access type (e.g., 3GPP, non-3GPP, or the like) of a BS to which the UE 100 accesses, UE location information (e.g., TA, or the like), or UE ID information (e.g., subscription permanent identifier (SUPI), 5G-globally unique temporary identifier (GUTI), or the like).

S-NSSAI included in the allowed slice is not S-NSSAI that is a target of NSAC, or if the S-NSSAI is S-NSSAI that is a target of NSAC but an access type to which the UE 100 accesses is not a target of NSAC, the AMF 120 may not perform operations 216 to 220. The AMF 120 according to an embodiment of the disclosure may perform operation 222, thereby delivering the allowed slice to the UE 100. For example, in operation 222, the AMF 120 may transmit a registration accept message including information about the allowed slice, to the 3GPP radio access network BS 110. The registration accept message transmitted to the 3GPP radio access network BS 110 may be delivered to the UE 100. According to another embodiment of the disclosure, when there is no allowed slice for the UE 100, the AMF 120 may transmit a registration reject message to the 3GPP radio access network BS 110. The registration reject message transmitted to the 3GPP radio access network BS 110 may be delivered to the UE 100.

Operation 218: The NSACF 180 may check a slice policy for a slice (e.g., S-NSSAI, requested NSSAI, allowed NSSAI, subscribed S-NSSAI, or the like) that is a target of NSAC and the number of currently-accessing UEs to the NSAC-target slice, which is received from the AMF 120. The NSACF 180 may determine whether S-NSSAI included in the slice received from the AMF 120 is S-NSSAI that is a target of NSAC, based on configuration information stored in the NSACF 180. For example, the configuration information may include information indicating whether S-NSSAI is a target of NSAC, information indicating whether S-NSSAI that is a target of NSAC is a target of EPC counting, information indicating whether S-NSSAI that is a target of NSAC is a target of 5GC counting, and information indicating which access type (e.g., 3GPP access, Non-3GPP access, both 3GPP access and Non-3GPP access, or the like) is a target of NSAC for S-NSSAI. The NSACF 180 may determine whether the slice and access type received from the AMF 120 are a target of NSAC, based on the configuration information and the information received from the AMF 120.

For example, the NSACF 180 may determine whether the access type included in the request message received from the AMF 120 is a target of NSAC. If the access type included in the request message received from the AMF 120 is the target of NSAC, the NSACF 180 may perform an operation of increasing or decreasing the number of currently-accessing UEs, as below. If the access type included in the request message received from the AMF 120 is not the target of NSAC, the NSACF 180 may not perform the operation of increasing or decreasing the number of currently-accessing UEs.

The NSACF 180 may compare a maximum number of UEs in the slice policy for the NSAC-target slice with the number of currently-accessing UEs with respect to the NSAC-target slice, and when the number of currently-accessing UEs with respect to the NSAC-target slice does not reach the maximum number of UEs, the NSACF 180 may determine that the NSAC-target slice is currently available. When the NSAC-target slice is currently available, the NSACF 180 may increase the number of currently-accessing UEs with respect to the NSAC-target slice by 1, based on the request message in operation 216. Also, in order to manage the number of accessing UEs using S-NSSAI, the NSACF 180 may store ID and access type of the UE 100 included in the request message of operation 216.

Alternatively, for example, the NSACF 180 may compare the maximum number of UEs in the slice policy for the NSAC-target slice with the number of currently-accessing UEs with respect to the NSAC-target slice, and when the number of currently-accessing UEs with respect to the NSAC-target slice reaches the maximum number of UEs, the NSACF 180 may determine that the NSAC-target slice is not currently available.

Operation 220: The NSACF 180 may transmit a slice availability response message to the AMF 120. The slice availability response message may include at least one of information about an NSAC-target slice (e.g., S-NSSAI, requested NSSAI, allowed NSSAI, subscribed S-NSSAI, or the like), availability of the NSAC-target slice (e.g., indication indicating availability or not-availability, a cause value, or the like), or information about an access type that is a target of NSAC. The information about an access type that is a target of NSAC may have various forms. For example, the information about an access type that is a target of NSAC may include information about an access type that is a target of NSAC for S-NSSAI, information about an access type that is not a target of NSAC for S-NSSAI, information indicating whether an access type received from the AMF 120 is a target of NSAC for S-NSSAI, or the like.

If the access type included in the request message received from the AMF 120 is not a target of NSAC, the slice availability response message may include information indicating that the access type for S-NSSAI requested by the AMF 120 is not a target of NSAC.

The AMF 120 may determine the allowed slice, according to the slice availability received from the NSACF 180. Also, the AMF 120 may determine an access type that is a target of NSAC for S-NSSAI, based on the configuration information stored in the AMF 120 and/or information received from the NSACF 180. For example, when availability of the slice (S-NSSAI) is received from the NSACF 180, and an access type (e.g., an access type to which the UE 100 accesses or an access type to be applied to the allowed slice) is a target of NSAC for S-NSSAI, the AMF 120 may include the slice (S-NSSAI) in the allowed slice. Alternatively, for example, when not-availability of the slice (S-NSSAI) is received from the NSACF 180, and an access type (e.g., an access type to which the UE 100 accesses or an access type to be applied to the allowed slice) of a BS to which the UE 100 accesses is a target of NSAC for S-NSSAI, the AMF 120 may not include the slice (S-NSSAI) in the allowed slice. In addition, the AMF 120 may include the slice (S-NSSAI) in a rejected slice. If an access type (e.g., an access type to which the UE 100 accesses or an access type to be applied to the allowed slice) is not a target of NSAC for S-NSSAI, the AMF 120 may not consider availability or not-availability of the slice received from the NSACF 180 when the AMF 120 determines the allowed slice.

Operation 222: The AMF 120 may transmit a registration accept message or a registration reject message to the BS 110, in response to the registration request message received in operation 214. The registration accept message may include information about at least one of the allowed slice (allowed NSSAI) or the rejected slice (rejected NSSAI). If there is no slice available for the UE 100, the AMF 120 may transmit the registration reject message.

Operation 224: The BS 110 may transmit, to the UE 100, the registration accept message or the registration reject message received from the AMF 120. When the UE 100 receives the registration accept message, the UE 100 may store information about the allowed slice and/or the rejected slice to be applied to an 3GPP AN, based on the information included in the registration accept message. Also, the UE 100 may use the allowed slice and/or the rejected slice, which is newly received, in the 3GPP AN in communication thereafter.

Operation 240: The UE 100 may access the non-3GPP access network 111 and then may transmit a registration request message. The registration request message may include information about requested NSSAI (e.g., S-NSSAI A) the UE 100 attempts to use. According to an embodiment of the disclosure, upon reception of the registration request message, the non-3GPP access network 111 may deliver the message received from the UE 100 to the N3F 115.

Operation 242: The N3F 115 may select the AMF 120 to which the registration request is to be transmitted, based on the requested NSSAI and/or UE ID (e.g., 5G-GUTI or the like) received from the UE 100. For example, the N3F 115 may select the AMF 120 indicated based on the UE ID (e.g., 5G-GUTI or the like).

Operation 244: The N3F 115 may transmit the registration request message to the AMF 120 selected in operation 242. The AMF 120 may determine an allowed slice (allowed NSSAI) to be applied to a non-3GPP access network (which transmitted the registration request message in operation 240) to which the UE 100 currently accesses, based on the requested NSSAI, subscribed S-NSSAI, a non-3GPP access network, and an operator policy which are related to the UE 100. Also, in order to determine the allowed slice, the AMF 120 may consider the allowed slice and/or the rejected slice determined in operation 210 to 224. For example, the AMF 120 may include the requested slice (e.g., S-NSSAI A) by the UE 100 in the allowed slice (e.g., S-NSSAI A).

Operation 246: The AMF 120 may determine whether S-NSSAI included in the allowed slice is S-NSSAI that is a target of NSAC, based on the configuration information stored in the AMF 120. When S-NSSAI included in the allowed slice is S-NSSAI that is a target of NSAC, the AMF 120 may check slice availability with the NSACF 180 of the 5G core network before the AMF 120 determines to allow the allowed slice for the UE 100. A method thereof is the same as the method described in operation 216.

If S-NSSAI included in the allowed slice is not S-NSSAI that is a target of NSAC, or if the S-NSSAI is S-NSSAI that is a target of NSAC but an access type to which the UE 100 accesses is not a target of NSAC, the AMF 120 may not perform operations 246 to 250. The AMF 120 according to an embodiment of the disclosure may perform operation 252 and operation 254, thereby delivering the allowed slice to the UE 100.

Operation 248: The NSACF 180 may determine whether S-NSSAI included in the slice received from the AMF 120 is S-NSSAI that is a target of NSAC, based on the configuration information stored in the NSACF 180. The NSACF 180 may perform an operation, according to a result of the determination. A method thereof is the same as the method described in operation 218.

Operation 250: The NSACF 180 may transmit a slice availability response message to the AMF 120. A method thereof is the same as the method described in operation 220.

The AMF 120 may determine the allowed slice, according to the slice availability received from the NSACF 180. A method thereof is the same as the method described in operation 220.

Operation 252: The AMF 120 may transmit, to the N3F 115, a response message (a registration accept message or a registration reject message) with respect to the registration request message received in operation 244. The registration accept message may include information about at least one of the allowed slice (allowed NSSAI) or a rejected slice (rejected NSSAI). If there is no slice available for the UE 100, the AMF 120 may transmit the registration reject message.

Operation 254: The N3F 115 may transmit the registration accept message or the registration reject message to the UE 100 via the non-3GPP access network 111. When the UE 100 receives the registration accept message, the UE 100 may store information about the allowed slice and/or the rejected slice to be applied to a non-3GPP AN, the information being included in the registration accept message. Also, the UE 100 may use the allowed slice and/or the rejected slice, which is newly received, in the non-3GPP AN in communication thereafter.

According to an embodiment of the disclosure, the NSACF 180 may determine slice availability per registration of UEs. Accordingly, even when the UE 100 requested a same slice (e.g., S-NSSAI A) in operations 210 and 240, availability of the slice may differ according to occurrence times of operations 218 and 248, an access type, or the like. That is, the NSACF 180 in operation 218 may determine that the slice e.g., S-NSSAI A) is available, but the NSACF 180 in operation 248 may determine that the slice (e.g., S-NSSAI A) is not available. That is, in a time point of operation 218, the number of currently-registered UEs is smaller than a maximum number of UEs and thus the slice may be available, but, in a time point of operation 248, the number of currently-registered UEs is equal to or greater than the maximum number of UEs and thus the slice may not be available.

Alternatively, an access type included in the request in operation 218 is an access type that is a target of NSAC for S-NSSAI and thus is determined to be available, but an access type included in the request in operation 248 is not an access type that is a target of NSAC for S-NSSAI and thus is determined not to be available. Accordingly, the AMF 120 may include the corresponding slice (e.g., S-NSSAI A) as allowed NSSAI in the registration accept message to be transmitted in operation 222, and the message may be transmitted to the UE 100 in operation 224. On the other hand, the AMF 120 may include the corresponding slice (e.g., S-NSSAI A) as rejected NSSAI in the registration accept message to be transmitted in operation 252, and the message may be transmitted to the UE 100 in operation 254.

With reference to FIG. 2, for descriptions of the disclosure, a registration procedure of a 3GPP access network and a registration procedure of a non-3GPP access network are sequentially described, however, the registration procedure of the 3GPP access network may occur after occurrence of the registration procedure of the non-3GPP access network.

Hereinafter, with reference to FIGS. 3 to 5, a UE-allowed slice change procedure according to an embodiment of the disclosure will now be described. When the UE 100 exchanges message with the AMF 120 via the non-3GPP access network 111, a message transmitted from the UE 100 to the non-3GPP access network 111 is delivered to the AMF 120 via the N3F 115, and a message to be transmitted from the AMF 120 to the non-3GPP access network 111 is delivered to the non-3GPP access network 111 via the N3F 115, but in drawing, message delivery via the N3F 115 is omitted. When embodiments of the disclosure are described, an access network and an access type may be interchangeably used.

For convenience of descriptions, a UE configuration update procedure will now be described as an example of a network slice registration management method according to an embodiment of the disclosure, however, embodiments of the disclosure may be applied not only to the UE configuration update procedure but also applied to network-initiated procedures initiated by a network or a server. For example, the network-initiated procedures initiated by a network or a server may include network-initiated deregistration, authentication authorization accounting (AAA) server triggered NSSAA, AAA server triggered NSSAA revocation, or the like. However, this is merely an example, and embodiments of the disclosure may be applied to any procedure initiated by a network or a server.

The AMF 120 according to an embodiment of the disclosure may determine to update configuration information of the UE 100, based on various reasons.

For example, an allowed slice transmitted from AMF 120 to the UE 100 via the procedure illustrated in FIG. 2 may include S-NSSAI A and S-NSSAI B. Here, in the procedure illustrated in FIG. 2 in which the AMF 120 determines the allowed slice, the AMF 120 may include, in the allowed slice, only a subscribed slice included in subscription information of the UE 100 which is stored in the UDM 145. That is, a slice to which the UE 100 subscribed, which is stored in the UDM 145, may include S-NSSAI A and S-NSSAI B. Afterward, S-NSSAI B may be deleted from the subscription information to which the UE 100 subscribed and which is stored in the UDM 145. The UDM 145 may notify the AMF 120 that S-NSSAI B has been deleted from the slice information to which the UE 100 subscribed. The AMF 120 may determine whether deleted S-NSSAI B is included in the allowed slice of the UE 100, and if included, the AMF 120 may determine to update configuration information of the UE 100 so as to delete S-NSSAI B from the allowed slice.

As another example, the allowed slice transmitted from the AMF 120 to the UE 100 via the procedure illustrated in FIG. 2 may include S-NSSAI A and S-NSSAI B. Afterward, S-NSSAI C may be added to the subscription information to which the UE 100 subscribed and which is stored in the UDM 145. The UDM 145 may notify the AMF 120 that S-NSSAI C is added to the subscription information to which the UE 100 subscribed. The AMF 120 may determine to add S-NSSAI C to the allowed slice. Accordingly, the AMF 120 may determine to update the configuration information of the UE 100 so as to add S-NSSAI C to the allowed slice.

Figure 3:
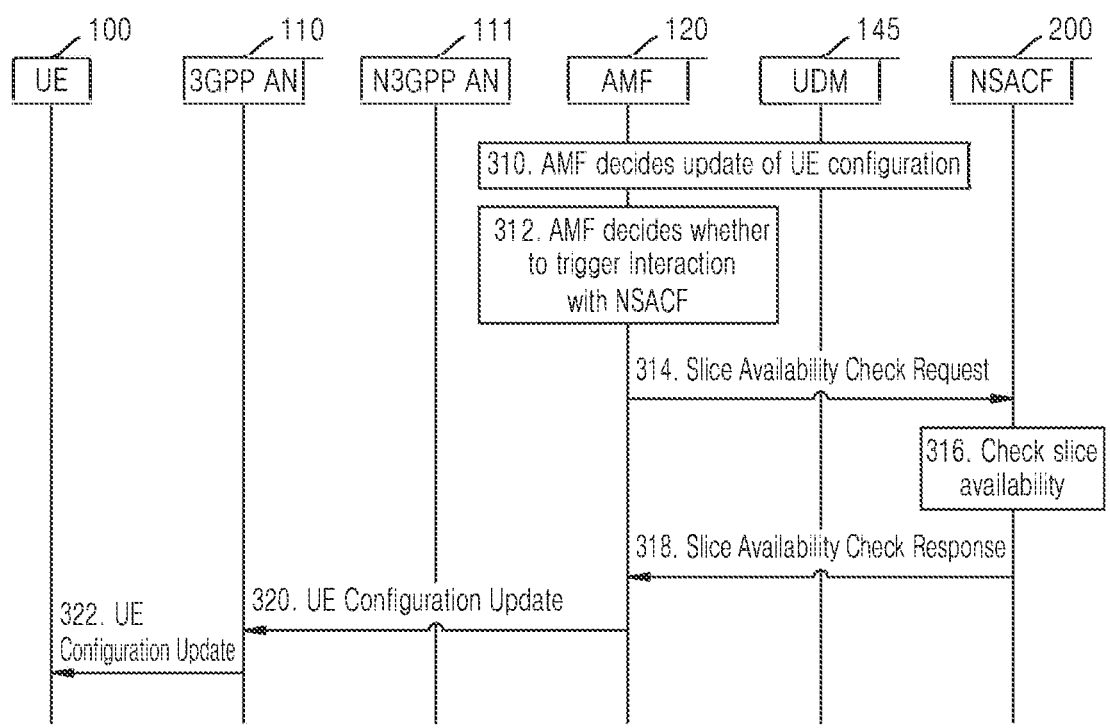
FIG. 3 illustrates a UE-allowed slice change procedure according to an embodiment of the present disclosure.

FIG. 3 illustrates a UE-allowed slice change procedure according to an embodiment of the present disclosure. Hereinafter, with reference to FIG. 3, a case where UE configuration information is updated to add S-NSSAI C to an allowed slice and a case where the UE configuration information is updated to delete S-NSSAI B from the allowed slice will now be described.

Case 1: Case where UE configuration information is updated to add S-NSSAI C to an allowed slice.

Operation 310: The AMF 120 may determine to update configuration information of the UE 100, due to various reasons. For example, the AMF 120 may determine to add another slice (e.g., S-NSSAI C) to an allowed slice (e.g., S-NSSAI A and S-NSSAI B are included) of the UE 100. Accordingly, the AMF 120 may determine to update the configuration information of the UE 100 so as to add S-NSSAI C to the allowed slice.

Operation 312: Before S-NSSAI C is added to the allowed slice, the AMF 120 may determine whether S-NSSAI C is S-NSSAI that is a target of NSAC, based on configuration information stored in the AMF 120. For example, when corresponding S-NSSAI C is S-NSSAI that is a target of NSAC, the AMF 120 may determine to perform a procedure (operations 314 to 318) with a NSACF 200. Also, the AMF 120 may determine one or more first access types to be applied to NSAC for corresponding S-NSSAI C, based on the stored configuration information. For example, the AMF 120 may determine that S-NSSAI C is a slice that is a target of NSAC, a 3GPP access type is applied to NSAC, and a non-3GPP access type is not applied to NSAC. Alternatively, the AMF 120 may determine that both a 3GPP access type and a non-3GPP access type are access types that are targets of NSAC.

The AMF 120 may determine one or more second access types to be applied to an allowed slice (i.e., an allowed slice to be change, change of allowed NSSAI) to which S-NSSAI C is to be added. For example, the AMF 120 may determine to add S-NSSAI C to the allowed slice corresponding to 3GPP access type or non-3GPP access type or both 3GPP access type and non-3GPP access type.

The AMF 120 may compare the first access type with the second access type.

As a result of the comparison, if the first access type and the second access type are the same, the AMF 120 may determine to perform a procedure (operations 314 to 316) with the NSACF 200. That is, when the second access type (e.g., 3GPP access) to be applied to the allowed slice to which S-NSSAI C is to be added by the AMF 120 is equal to the first access type (e.g., 3GPP access) that is a target of NSAC, a procedure (operations 314 to 318) may be performed between the AMF 120 and the NSACF 200.

As a result of the comparison, if the first access type and the second access type are not the same, that is, if the second access type (e.g., 3GPP access) to be applied to the allowed slice to which S-NSSAI C is to be added by the AMF 120 is not equal to the first access type that is a target of NSAC (e.g., non-3GPP access or both 3GPP access and non-3GPP access are not a target of NSAC), the AMF 120 may determine not to perform the procedure (operations 314 to 318) with the NSACF 200.

Operation 314: The AMF 120 having determined to perform the procedure with the NSACF 200 in operation 312 may check slice availability with the NSACF 200 of a 5G core network before the AMF 120 determines to add S-NSSAI C to the allowed slice of the UE 100. That is, the AMF 120 may request an increase in a current number of UEs with respect to the allowed slice. To do so, the AMF 120 may transmit a slice availability request message to the NSACF 200. The slice availability request message may include at least one of slice information (e.g., S-NSSAI(s), requested NSSAI, allowed NSSAI, subscribed S-NSSAI, or the like) that is a target of NSAC and is to be added to the allowed slice, second access type information (e.g., 3GPP, non-3GPP, both 3GPP and non-3GPP, or the like), UE location information (e.g., TA, or the like), UE ID information (e.g., SUPI, 5G-GUTI, or the like), or update flag (e.g., an indicator indicating an increase in a current number of UEs).

Operation 316: The NSACF 200 may check the number of currently-accessing UEs to a slice which is received from the AMF 120. The NSACF 200 may determine whether to allow the slice, based on information about the received number of currently-accessing UEs and a maximum number of UEs with respect to the slice. A method thereof is the same as the method described in operation 218.

Operation 318: The NSACF 200 may transmit a slice availability response message to the AMF 120. The AMF 120 may determine the allowed slice, based on at least one of information about availability or non-availability of the slice and/or an access type that is a target of NSAC for S-NSSAI, which are received from the NSACF 200, or the configuration information of the AMF 120. A method thereof is the same as the method described in operation 220.

Operation 320: The AMF 120 may transmit, to the UE 100, a UE configuration update message including information about the allowed slice that is finally determined. In addition, the UE configuration update message may include information about a rejected slice determined by the AMF 120. For example, when the NSACF 200 determines that S-NSSAI C is available, the S-NSSAI C may be included in the allowed slice. As another example, when the NSACF 200 determines that S-NSSAI C is not available, the S-NSSAI C may be included in the rejected slice. The UE configuration update message may be transmitted to the UE 100 via the BS 110 that supports the second access type (e.g., 3GPP access) applied to the allowed slice.

Operation 322: The BS 110 may transmit the UE configuration update message to the UE 100. Upon reception of the UE configuration update message, the UE 100 may store information about the allowed slice and/or the rejected slice which is to be applied to the second access type and is included in the UE configuration update message. Also, the UE 100 may use the allowed slice and/or the rejected slice, which is newly received, in the second access type in communication thereafter.

Case 2: Case where UE configuration information is updated to delete S-NSSAI B from an allowed slice.

Operation 310: The AMF 120 may determine to update configuration information of the UE 100, due to various reasons. For example, the AMF 120 may determine to delete some (e.g., S-NSSAI B) or all of slices included in the allowed slice (e.g., S-NSSAI A, S-NSSAI B are included) of the UE 100. Accordingly, the AMF 120 may determine to update the configuration information of the UE 100 so as to delete S-NSSAI B from the allowed slice.

Operation 312: Before S-NSSAI B is deleted from the allowed slice, the AMF 120 may determine whether S-NSSAI B is S-NSSAI that is a target of NSAC, based on the configuration information stored in the AMF 120. For example, when corresponding S S-NSSAI B is S-NSSAI that is a target of NSAC, the AMF 120 may determine to perform a procedure (operations 314 to 318) with the NSACF 200. Also, the AMF 120 may determine one or more first access types to be applied to NSAC for corresponding S-NSSAI B, based on the stored configuration information. For example, the AMF 120 may determine that S-NSSAI B is a slice that is a target of NSAC, a 3GPP access type is applied to NSAC, and a non-3GPP access type is not applied to NSAC. Alternatively, the AMF 120 may determine that both a 3GPP access type and a non-3GPP access type are access types that are targets of NSAC.

The AMF 120 may determine one or more second access types to be applied to the allowed slice from the S-NSSAI B is to be deleted. For example, the AMF 120 may determine to delete S-NSSAI B from the allowed slice corresponding to 3GPP access type or non-3GPP access type or both 3GPP access type and non-3GPP access type.

The AMF 120 may compare the first access type with the second access type.

As a result of the comparison, if the first access type and the second access type are the same, the AMF 120 may determine to perform a procedure (operations 314 to 316) with the NSACF 200. That is, when the second access type (e.g., 3GPP access) to be applied to the allowed slice from which S-NSSAI B is to be deleted by the AMF 120 is equal to the first access type (e.g., 3GPP access) that is a target of NSAC, a procedure (operations 314 to 316) may be performed between the AMF 120 and the NSACF 200.

As a result of the comparison, if the first access type and the second access type are not the same, that is, if the second access type (e.g., 3GPP access) to be applied to the allowed slice from which S-NSSAI B is to be deleted by the AMF 120 is not equal to the first access type that is a target of NSAC (e.g., non-3GPP access or both 3GPP access and non-3GPP access are not a target of NSAC), the AMF 120 may determine not to perform the procedure (operations 314 to 316) with the NSACF 200.

Operation 314: The AMF 120 having determined to perform a procedure with the NSACF 200 in operation 312 may check slice availability with the NSACF 200 of the 5G core network before the AMF 120 determines to delete S-NSSAI B from the allowed slice of the UE 100. That is, the AMF 120 may request a decrease in a current number of UEs with respect to the allowed slice. To do so, the AMF 120 may transmit a slice availability request message to the NSACF 200. The slice availability request message may include at least one of slice information (e.g., S-NSSAI(s), requested NSSAI, allowed NSSAI, subscribed S-NSSAI, or the like) that is a target of NSAC and is to be deleted from the allowed slice, second access type information (e.g. 3GPP, non-3GPP, both 3GPP and non-3GPP, or the like), UE location information (e.g., TA, or the like), UE ID information (e.g., SUPI, 5G-GUTI, or the like), or update flag (e.g., an indicator indicating a decrease in a current number of UEs).

Operation 316: The NSACF 200 may decrease the number of currently-accessing UEs to a slice which is received from the AMF 120. Also, the NSACF 200 may delete the received UE ID from a UE ID list managed by the NSACF 200.

Operation 318: The NSACF 200 may transmit a slice availability response message to the AMF 120. The slice availability response message may include information indicating that the request (the decrease in the current number of UEs) by the AMF 120 is successfully processed. The AMF 120 may delete S-NSSAI B from the allowed slice of the UE 100. In addition, the AMF 120 may determine that S-NSSAI B deleted from the allowed slice is a rejected slice.

Operation 320: The AMF 120 may transmit, to the UE 100, a UE configuration update message including information about the allowed slice that is finally determined. In addition, the UE configuration update message may include information about the rejected slice determined by the AMF 120. The UE configuration update message may be transmitted to the UE 100 via the BS 110 that supports the second access type (e.g., 3GPP access) applied to the allowed slice.

Operation 322: The BS 110 may transmit the UE configuration update message to the UE 100. Upon reception of the UE configuration update message, the UE 100 may store information about the allowed slice and/or the rejected slice which is to be applied to the second access type and is included in the UE configuration update message. Also, the UE 100 may use the allowed slice and/or the rejected slice, which is newly received, in the second access type in communication thereafter.

Case 3: A case where configuration of a UE is updated to delete S-NSSAI B from an allowed slice and to add S-NSSAI C to the allowed slice (usage of separate procedures)

Figure 4:
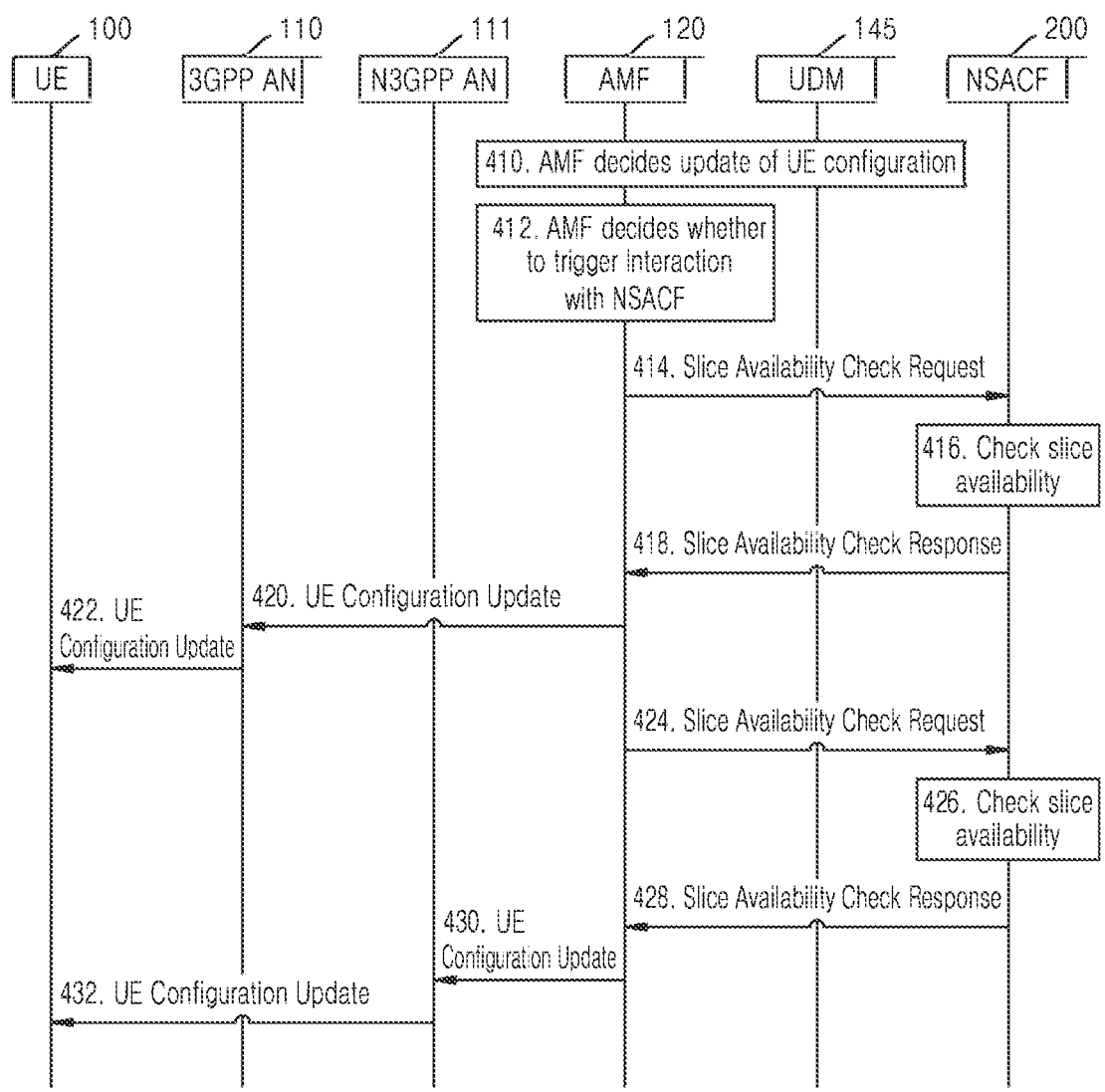
FIG. 4 illustrates a method of adding a new slice to an allowed slice and deleting an existing slice from the allowed slice by using separate procedures according to an embodiment of the present disclosure.

FIG. 4 illustrates a method of adding a new slice to an allowed slice and deleting an existing slice from the allowed slice by using separate procedures according to an embodiment of the present disclosure. FIG. 4 illustrates a method by which a procedure for adding a new slice to an allowed slice and a procedure for deleting an existing slice from the allowed slice are performed with different messages.

Operation 410: The AMF 120 may determine to update configuration information of the UE 100, based on various reasons. For example, the AMF 120 may determine to add another slice (e.g., S-NSSAI C) to an allowed slice (e.g., S-NSSAI A and S-NSSAI B are included) of the UE 100. Also, the AMF 120 may determine to delete some (e.g., S-NSSAI B) or all of slices included in the allowed slice (e.g., S-NSSAI A, S-NSSAI B are included) of the UE 100. Accordingly, the AMF 120 may determine to update the configuration information of the UE 100 so as to add S-NSSAI C to the allowed slice and delete S-NSSAI B from the allowed slice.

Operation 412: Before S-NSSAI C is added to the allowed slice and S-NSSAI B is deleted from the allowed slice, the AMF 120 may determine whether S-NSSAI B and S-NSSAI C are S-NSSAIs that are targets of NSAC, based on the configuration information stored in the AMF 120. For example, when corresponding S-NSSAI B and/or S-NSSAI C is S-NSSAI that is a target of NSAC, the AMF 120 may determine to perform a procedure (operations 414 to 418) with the NSACF 200. Also, the AMF 120 may determine one or more first access types to be applied to NSAC for corresponding S-NSSAI B and S-NSSAI C, based on the stored configuration information. For example, the AMF 120 may determine that S-NSSAI B and/or S-NSSAI C is a slice that is a target of NSAC, a 3GPP access type is applied to NSAC, and a non-3GPP access type is not applied to NSAC. Alternatively, the AMF 120 may determine that both a 3GPP access type and a non-3GPP access type are access types that are targets of NSAC for S-NSSAI B and/or S-NSSAI C.

The AMF 120 may determine one or more second access types to be applied to an allowed slice (i.e., an allowed slice to be change, change of allowed NSSAI) to which S-NSSAI B and/or S-NSSAI C is to be added. For example, the AMF 120 may determine to add S-NSSAI B and/or C to the allowed slice corresponding to 3GPP access type or non-3GPP access type or both 3GPP access type and non-3GPP access type.

The AMF 120 may compare the first access type with the second access type.

As a result of the comparison, if the first access type and the second access type for S-NSSAI B are the same, that is, when the second access type (e.g., 3GPP access, non-3GPP access, or both 3GPP access and non-3GPP access) to be applied to the allowed slice from which S-NSSAI B is to be deleted by the AMF 120 is equal to the first access type (e.g., 3GPP access, non-3GPP access, or both 3GPP access and non-3GPP access) that is a target of NSAC for S-NSSAI B, the AMF 120 may perform a procedure (operations 414 to 418) with the NSACF 200 before S-NSSAI B is deleted from the allowed slice.

As a result of the comparison, if the first access type and the second access type for S-NSSAI C are the same, that is, when the second access type (e.g., 3GPP access, non-3GPP access, or both 3GPP access and non-3GPP access) to be applied to the allowed slice to which S-NSSAI C is to be added by the AMF 120 is equal to the first access type (e.g., 3GPP access, non-3GPP access, or both 3GPP access and non-3GPP access) that is a target of NSAC for S-NSSAI C, the AMF 120 may perform a procedure (operations 414 to 418) with the NSACF 200 before S-NSSAI C is added to the allowed slice.

As a result of the comparison, if the first access type and the second access type are not the same, that is, if the second access type (e.g., 3GPP access) to be applied to the allowed slice is not equal to the first access type that is a target of NSAC (e.g., non-3GPP access or both 3GPP access and non-3GPP access are not a target of NSAC), the AMF 120 may determine not to perform the procedure (operations 414 to 418) with the NSACF 200. The AMF 120 according to an embodiment of the disclosure may perform operation 420 to transmit a UE configuration update message to the 3GPP BS 110. The UE configuration update message may be delivered from the BS 110 to the UE 100.

Operation 414: The AMF 120 having determined to perform the procedure with the NSACF 200 in operation 412 may check slice availability with the NSACF 200 of a 5G core network before the AMF 120 determines to add S-NSSAI C to the allowed slice of the UE 100, That is, the AMF 120 may request an increase in a current number of UEs using S-NSSAI C. To do so, the AMF 120 may transmit a slice availability request message to the NSACF 200. The slice availability request message may include at least one of slice information (e.g., S-NSSAI(s), requested NSSAI, allowed NSSAI, subscribed S-NSSAI, or the like) that is a target of NSAC and is to be added to the allowed slice, second access type information (e.g., 3GPP, non-3GPP, both 3GPP and non-3GPP, or the like), UE location information (e.g., TA, or the like), UE ID information (e.g., SUPI, 5G-GUTI, or the like), or update flag (e.g., an indicator indicating an increase in a current number of UEs).

Operation 416: The NSACF 200 may check the number of currently-accessing UEs to a slice which is received from the AMF 120. The NSACF 200 may determine whether to allow the slice, based on information about the received number of currently-accessing UEs and a maximum number of UEs with respect to the slice. A method thereof is the same as the method described in operation 316.

Operation 418: The NSACF 200 may transmit a slice availability response message to the AMF 120. The AMF 120 may determine the allowed slice, based on at least one of information about availability or non-availability of the slice and/or an access type that is a target of NSAC for S-NSSAI, which are received from the NSACF 200, or the configuration information of the AMF 120. A method thereof is the same as the method described in operation 318.

Operation 420: The AMF 120 may transmit, to the UE 100, a UE configuration update message including information about the allowed slice that is finally determined. The UE configuration update message may be delivered from the 3GPP BS 110 to the UE 100. In addition, the UE configuration update message may include information about a rejected slice determined by the AMF 120. The UE configuration update message may be transmitted to the UE 100 via the BS 110 that supports the second access type (e.g., 3GPP access) applied to the allowed slice.

Operation 422: The BS 110 may transmit the UE configuration update message to the UE 100. Upon reception of the UE configuration update message, the UE 100 may store information about the allowed slice and/or the rejected slice which is to be applied to the second access type and is included in the UE configuration update message. Also, the UE 100 may use the allowed slice and/or the rejected slice, which is newly received, in the second access type in communication thereafter.

Operation 424: The AMF 120 having determined to perform a procedure with the NSACF 200 in operation 412 may check slice availability with the NSACF 200 of the 5G core network before the AMF 120 determines to delete S-NSSAI B from the allowed slice of the UE 100. That is, the AMF 120 may request a decrease in a current number of UEs using S-NSSAI B. To do so, the AMF 120 may transmit a slice availability request message to the NSACF 200. The slice availability request message may include at least one of slice information (e.g., S-NSSAI(s), requested NSSAI, allowed NSSAI, subscribed S-NSSAI, or the like) that is a target of NSAC and is to be deleted from the allowed slice, second access type information (e.g., 3GPP, non-3GPP, both 3GPP and non-3GPP, or the like), UE location information (e.g., TA, or the like), UE ID information (e.g., SUPI, 5G-GUTI, or the like), or update flag (e.g., an indicator indicating a decrease in a current number of UEs).

Operation 426: The NSACF 200 may decrease the number of currently-accessing UEs to a slice which is received from the AMF 120. Also, the NSACF 200 may delete the received UE ID from a UE ID list managed by the NSACF 200. A method thereof is the same as the method described in operation 316.

Operation 428: The NSACF 200 may transmit a slice availability response message to the AMF 120. The slice availability response message may include information indicating that the request (the decrease in the current number of UEs) by the AMF 120 is successfully processed. The AMF 120 may delete S-NSSAI B from the allowed slice of the UE 100. In addition, the AMF 120 may determine that S-NSSAI B deleted from the allowed slice is a rejected slice. A method thereof is the same as the method described in operation 318.

Operation 430: The AMF 120 may transmit, to the UE 100, a UE configuration update message including information about the allowed slice that is finally determined. In addition, the UE configuration update message may include information about the rejected slice determined by the AMF 120. The UE configuration update message may be transmitted to the UE 100 via the non-3GPP access network 111 that supports the second access type (e.g., non-3GPP access) applied to the allowed slice.

Operation 432: The non-3GPP access network 111 may transmit the UE configuration update message to the UE 100. Upon reception of the UE configuration update message, the UE 100 may store information about the allowed slice and/or the rejected slice which is to be applied to the second access type and is included in the UE configuration update message. Also, the UE 100 may use the allowed slice and/or the rejected slice, which is newly received, in the second access type in communication thereafter.

With reference to FIG. 4, for convenience of the descriptions, the procedure for adding a new slice to an allowed slice and the procedure for deleting an existing slice from the allowed slice are sequentially described, however, the procedure for adding a new slice to an allowed slice may occur after the procedure for deleting an existing slice from the allowed slice is performed.

According to the embodiment of FIG. 4, when the procedure for adding a new slice to an allowed slice and the procedure for deleting an existing slice from the allowed slice are performed with different messages, the NSACF 200 may separately process each of the messages. That is, a result of admission control of a slice newly added to an allowed slice of the UE 100 and a result of admission control of a slice deleted from the allowed slice of the UE 100 may be independent from each other and may have no affect with respect to each other. According to an embodiment of the disclosure, in operation 412, the AMF 120 may determine to delete S-NSSAI from the allowed slice for 3GPP access and to add the S-NSSAI to the allowed slice for non-3GPP access. To do so, the AMF 120 may perform a procedure for deleting S-NSSAI from the allowed slice for 3GPP access and a procedure for adding the S-NSSAI to the allowed slice for non-3GPP access.

Because a result of admission control of a slice newly added to an allowed slice of the UE 100 and a result of admission control of a slice deleted from the allowed slice of the UE 100 are independent from each other and have no affect with respect to each other, a result of the procedure for adding the S-NSSAI to the allowed slice for non-3GPP access may not be guaranteed for success. That is, although S-NSSAI is deleted from the allowed slice for 3GPP access, the NSACF 200 may reject a request for an increase in the number of UEs so as to add the S-NSSAI the allowed slice for non-3GPP access, and thus, the S-NSSAI may not be added to the allowed slice for non-3GPP access.

Case 4: A case where configuration of a UE is updated to delete S-NSSAI B from an allowed slice and to add S-NSSAI C to the allowed slice (usage of integrated procedure)

Figure 5:
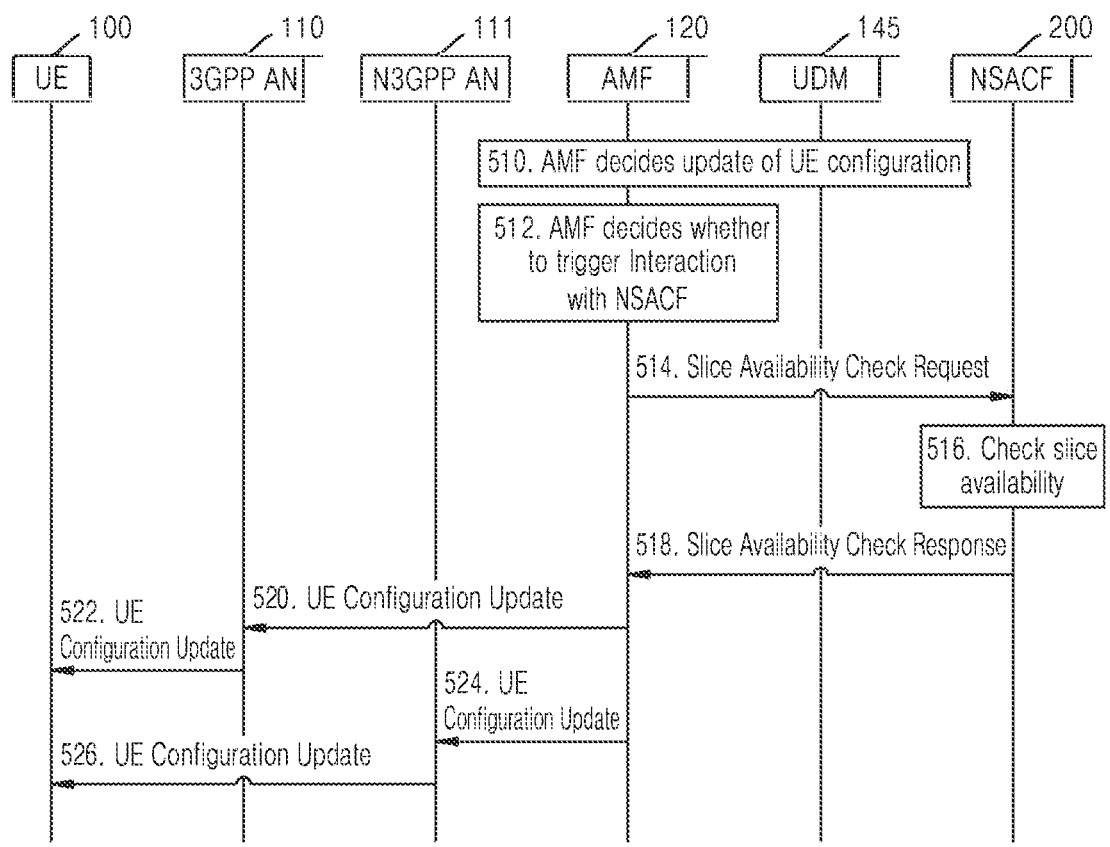
FIG. 5 illustrates a method of adding a new slice to an allowed slice and deleting an existing slice from the allowed slice by using an integrated procedure according to an embodiment of the present disclosure.

FIG. 5 illustrates a method of adding a new slice to an allowed slice and deleting an existing slice from the allowed slice by using an integrated procedure according to an embodiment of the present disclosure. With reference to FIG. 5, a method by which a procedure for adding a new slice to an allowed slice and a procedure for deleting an existing slice from the allowed slice are performed with one integrated message will now be described.

Operation 510: The AMF 120 may determine to update configuration information of the UE 100, based on various reasons. For example, the AMF 120 may determine to add another slice (e.g., S-NSSAI C) to an allowed slice (e.g., S-NSSAI A and S-NSSAI B are included) of the UE 100. Also, the AMF 120 may determine to delete some (e.g., S-NSSAI B) or all of slices included in the allowed slice (e.g., S-NSSAI A, S-NSSAI B are included) of the UE 100.

Accordingly, the AMF 120 may determine to update the configuration information of the UE 100 so as to add S-NSSAI C to the allowed slice and delete S-NSSAI B from the allowed slice.

Operation 512: Before S-NSSAI C is added to the allowed slice and S-NSSAI B is deleted from the allowed slice, the AMF 120 may determine whether S-NSSAI B and S-NSSAI C are S-NSSAIs that are targets of NSAC, based on the configuration information stored in the AMF 120. The AMF 120 may determine one or more first access types to be applied to NSAC for corresponding S-NSSAI B and S-NSSAI C, based on the stored configuration information. The AMF 120 may determine one or more second access types to be applied to an allowed slice to which S-NSSAI B and/or S-NSSAI C is to be added. A procedure therefor is the same as operation 412.

Operation 514: The AMF 120 having determined to perform the procedure with the NSACF 200 in operation 512 may check slice availability with the NSACF 200 of the 5G core network before the AMF 120 determines to add S-NSSAI C to the allowed slice of the UE 100 and to delete S-NSSAI B from the allowed slice. That is, the AMF 120 may request a decrease in a current number of UEs using S-NSSAI B and/or an increase in a current number of UEs using S-NSSAI C. To do so, the AMF 120 may transmit a slice availability request message to the NSACF 200. The slice availability request message may include at least one of slice information (e.g., S-NSSAI(s), requested NSSAI, allowed NSSAI, subscribed S-NSSAI, or the like) that is a target of NSAC and is to be added to the allowed slice, second access type information (e.g., 3GPP, non-3GPP, both 3GPP and non-3GPP, or the like) to be applied to the allowed slice (i.e., an allowed slice to be change, change of allowed NSSAI) to which a slice is to be added, UE location information (e.g., TA, or the like) to be applied to the allowed slice to which the slice is to be added, update flag (e.g., an indicator indicating an increase in a current number of UEs) to be applied to the allowed slice to which the slice is to be added, slice information (e.g., S-NSSAI(s), requested NSSAI, allowed NSSAI, subscribed. S-NSSAI, or the like) that is a target of NSAC and is to be deleted from the allowed slice, second access type information (e.g., 3GPP, non-3GPP, both 3GPP and non-3GPP, or the like) to be applied to the allowed slice (i.e., an allowed slice to be change, change of allowed NSSAI) from which a slice is to be deleted, UE location information (e.g., TA, or the like) to be applied to the allowed slice from which the slice is to be deleted, update flag (e.g., an indicator indicating a decrease in a current number of UEs) to be applied to the allowed slice from which the slice is to be deleted, or UE ID information (e.g., SUPI, 5G-GUTI, or the like).

According to an embodiment of the disclosure, as the AMF 120 determines to perform a procedure with the NSACF 200 by determining to delete S-NSSAI from the allowed slice for 3GPP access and to add the S-NSSAI to the allowed slice for non-3GPP access in operation 512, the AMF 120 may request the NSACF 200 of the 5G core network for a change in an access type for S-NSSAI, i.e., a change in an access type of registered S-NSSAI from 3GPP access to non-3GPP access. To do so, the AMF 120 may transmit a slice availability request message to the NSACF 200. The slice availability request message may include at least one of slice information (e.g., S-NSSAI(s), requested NSSAI, allowed NSSAI, subscribed S-NSSAI, or the like) that is a target of NSAC, current access type information (e.g., 3GPP access) using a slice, new access type information (e.g., non-3GPP access) to use the slice, UE location information (e.g., TA, or the like), UE ID information (e.g., SUPI, 5G-GUTI, or the like), or update flag (e.g. an indicator indicating a change in an access type).

Operation 516: When the update flag indicates an indicator of an increase in the number of UEs and/or a decrease in the number of UEs, the NSACF 200 may check the number of currently-accessing UEs to the slice which is received from the AMF 120. The NSACF 200 may determine whether to allow the slice, based on received information about the number of currently-accessing UEs and a maximum number of UEs with respect to the slice. A method thereof is the same as the method described in operation 316.

According to another embodiment of the disclosure, when the update flag indicates the indicator indicating a change in an access type, the NSACF 200 may change an access type stored with UE ID for S-NSSAI from current access type information (e.g., 3GPP access) using a slice to new access type information (e.g., non-3GPP access) to use the slice. As an access type for S-NSSAI is changed, the NSACF 200 may not increase or decrease the number of UEs.

Operation 518: The NSACF 200 may transmit a slice availability response message to the AMF 120. The AMF 120 may determine the allowed slice, based on at least one of information about availability or non-availability of the slice and/or an access type that is a target of NSAC for S-NSSAI, which are received from the NSACF 200, or the configuration information of the AMF 120. A method thereof is the same as the method described in operation 318.

Operation 520: The AMF 120 may transmit, to the 3GPP BS 110, a UE configuration update message including information about the allowed slice that is finally determined. The UE configuration update message may be delivered from the 3GPP BS 110 to the UE 100. In addition, the UE configuration update message may include information about a rejected slice determined by the AMF 120. The UE configuration update message may be transmitted to the UE 100 via the BS 110 that supports the second access type (e.g., 3GPP access) applied to the allowed slice.

Operation 522: The 3GPP BS 110 may transmit the UE configuration update message to the UE 100. Upon reception of the UE configuration update message, the UE 100 may store information about the allowed slice and/or the rejected slice which is to be applied to the second access type and is included in the UE configuration update message. Also, the UE 100 may use the allowed slice and/or the rejected slice, which is newly received, in the second access type in communication thereafter.

Operation 524: The AMT 120 may transmit, to the 3GPP BS 110, a UE configuration update message including information about the allowed slice that is finally determined. The UE configuration update message may be delivered from the 3GPP BS 110 to the UE 100. In addition, the UE configuration update message may include information about the rejected slice determined by the AMF 120. The UE configuration update message may be transmitted to the UE 100 via the non-3GPP access network 111 that supports the second access type (e.g., non-3GPP access) applied to the allowed slice.

Operation 526: The non-3GPP access network 111 may transmit the UE configuration update message to the UE 100. Upon reception of the UE configuration update message, the UE 100 may store information about the allowed slice and/or the rejected slice which is to be applied to the second access type and is included in the UE configuration update message. Also, the UE 100 may use the allowed slice and/or the rejected slice, which is newly received, in the second access type in communication thereafter.

With reference to FIG. 5, for convenience of the descriptions, the procedure for adding a new slice to an allowed slice and the procedure for deleting an existing slice from the allowed slice are sequentially described, however, the procedure for adding a new slice to an allowed slice may occur after the procedure for deleting an existing slice from the allowed slice is performed.

According to the embodiment of FIG. 5, the procedure for adding a new slice to an allowed slice and the procedure for deleting an existing slice from the allowed slice may be performed with one integrated message. According to an embodiment of the disclosure, in operation 512, the AMF 120 may determine to delete S-NSSAI from the allowed slice for 3GPP access and to add the S-NSSAI to the allowed slice for non-3GPP access. To do so, the AMF 120 may perform a procedure for changing an access network for S-NSSAI. As a procedure for adding the S-NSSAI to the allowed slice for non-3GPP access does not request an increase in the number of UEs, the S-NSSAI may be added to the allowed slice for non-3GPP access.

Figure 6:
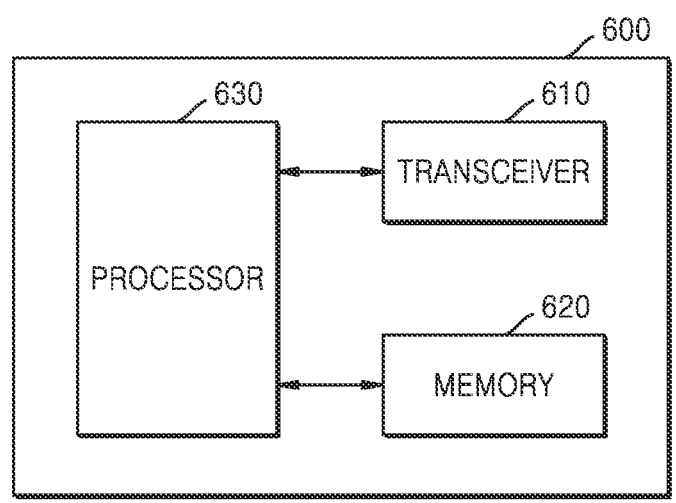
FIG. 6 illustrates a configuration of a UE according to an embodiment of the present disclosure.

FIG. 6 illustrates a configuration of a UE 600 according to an embodiment of the present disclosure.

As illustrated in FIG. 6, the UE 600 of the disclosure may include a transceiver 610, a memory 620, and a processor 630. According to the communication method of the UE 600, the processor 630, the transceiver 610 and the memory 620 of the UE 600 may operate. However, the elements of the UE 600 are not limited thereto. For example, the UE 600 may include more elements or fewer elements than the elements described above. Furthermore, the processor 630, the transceiver 610 and the memory 620 may be implemented as one chip.

The transceiver 610 is a collective term of a receiver of the UE 600 and a transmitter of the UE 600, and may transmit or receive a signal to or from a BS or a network entity. The signal transmitted to or received from the BS may include control information and data. To this end, the transceiver 610 may include a radio frequency (RF) transmitter for up-converting and amplifying a frequency of a signal to be transmitted, and an RF receiver for low-noise amplifying and down-converting a frequency of a received signal. However, this is merely an example of the transceiver 610, and elements of the transceiver 610 are not limited to the RF transmitter and the RF receiver.

Also, the transceiver 610 may include a wired or wireless transceiver, and may include various configurations for transmitting and receiving signals.

Also, the transceiver 610 may receive signals via wireless channels and output the signals to the processor 630, and may transmit signals output from the processor 630, via wireless channels.

Also, the transceiver 610 may receive communication signals and output the communication signals to the processor, and may transmit signals output from the processor, to the network entity via a wireless or wired network.

The memory 620 may store programs and data required to operate the UE 600. Also, the memory 620 may store control information or data included in a signal obtained by the UE 600. The memory 620 may be implemented as a storage medium including a read only memory (ROM), a random access memory (RAM), a hard disk, a compact disc (CD)-ROM, a digital versatile disc (DVD), or the like, or any combination thereof.

The processor 630 may control a series of processes so that the UE 600 operates according to the embodiments of the disclosure. The processor 630 may include at least one processor. For example, the processor 630 may include a communication processor (CP) for controlling communications and an application processor (AP) for controlling a higher layer such as an application program.

Figure 7:
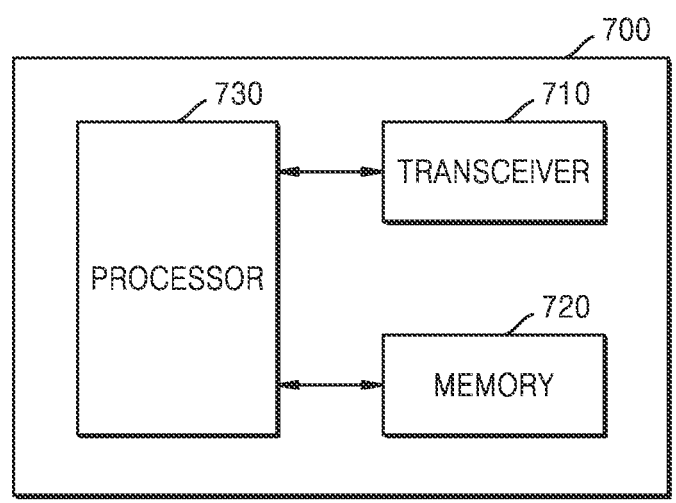
FIG. 7 illustrates a configuration of a network entity according to an embodiment of the present disclosure.

FIG. 7 illustrates a configuration of a network entity 700 according to an embodiment of the present disclosure.

As illustrated in FIG. 7, the network entity 700 of the disclosure may include a transceiver 710, a memory 720, and a processor 730. According to the communication method of the network entity 700, the processor 730, the transceiver 710 and the memory 720 of the network entity 700 may operate. However, the elements of the network entity 700 are not limited thereto. For example, the network entity 700 may include more elements or fewer elements than the elements described above. Furthermore, the processor 730, the transceiver 710 and the memory 720 may be implemented as one chip. The network entity 700 may include NFs such as an AMF, an SMF, a PCF, a UDM, a UPF, or the like which are described above. Also, the network entity 700 may include a BS.

The transceiver 710 is a collective term of a receiver of the network entity 700 and a transmitter of the network entity 700, and may transmit or receive a signal to or from a UE or another network entity. The signal being transmitted or received may include control information and data. To this end, the transceiver 710 may include an RF transmitter for up-converting and amplifying a frequency of a signal to be transmitted, and an RF receiver for low-noise amplifying and down-converting a frequency of a received signal. However, this is merely an example of the transceiver 710, and elements of the transceiver 710 are not limited to the RF transmitter and the RF receiver. Also, the transceiver 710 may include a wired or wireless transceiver, and may include various configurations for transmitting and receiving signals.

Also, the transceiver 710 may receive signals via communication signals (e.g., wireless channels) and output the signals to the processor 730, and may transmit signals output from the processor 730, via communication channels.

Also, the transceiver 710 may receive communication signals and output the communication signals to the processor, and may transmit signals output from the processor, to a UE or a network entity via a wireless or wired network.

The memory 720 may store programs and data required to operate the network entity 700. Also, the memory 720 may store control information or data included in a signal obtained by the network entity 700. The memory 720 may be implemented as a storage medium including a ROM, a RAM, a hard disk, a CD-ROM, a DVD, or the like, or any combination thereof.

The processor 730 may control a series of processes to allow the network entity 700 to operate according to the aforementioned embodiments of the disclosure. The processor 730 may include at least one processor.

A network slicing technology has been introduced to support various services in various network structures. The network slicing refers to a technology for logically configuring a network with a set of NFs to support a particular service, and separating a slice from other slice. When one UE receives various services, the UE may access two or more slices. When there is a need to adjust a total number for slice via an NSAC procedure, a quota check may be performed on S-NSSAI (e.g., when a session associated with S-NSSAI is handed over from an evolved packet core (EPC) to a 5GC), and in response to a result thereof, a problem may occur as continuity of a service is not supported.

In order to solve the problem, the disclosure provides a method of processing a control signal in a wireless communication system, the method including: receiving a first control signal transmitted from a BS; processing the received first control signal; and transmitting, to the BS, a second control signal generated based on the processing.

According to an embodiment of the disclosure, in a situation where a total amount of slices is adjusted via an NSAC procedure in a wireless communication system, a case where service continuity is not supported depending on a result of a quota check with respect to S-NSSAI (e.g., a case where a session associated with S-NSSAI is handed over from an EPC to a 5GC) may be prevented, and an NSAC procedure exemption service to support service continuity may be provided.

Figure 8:
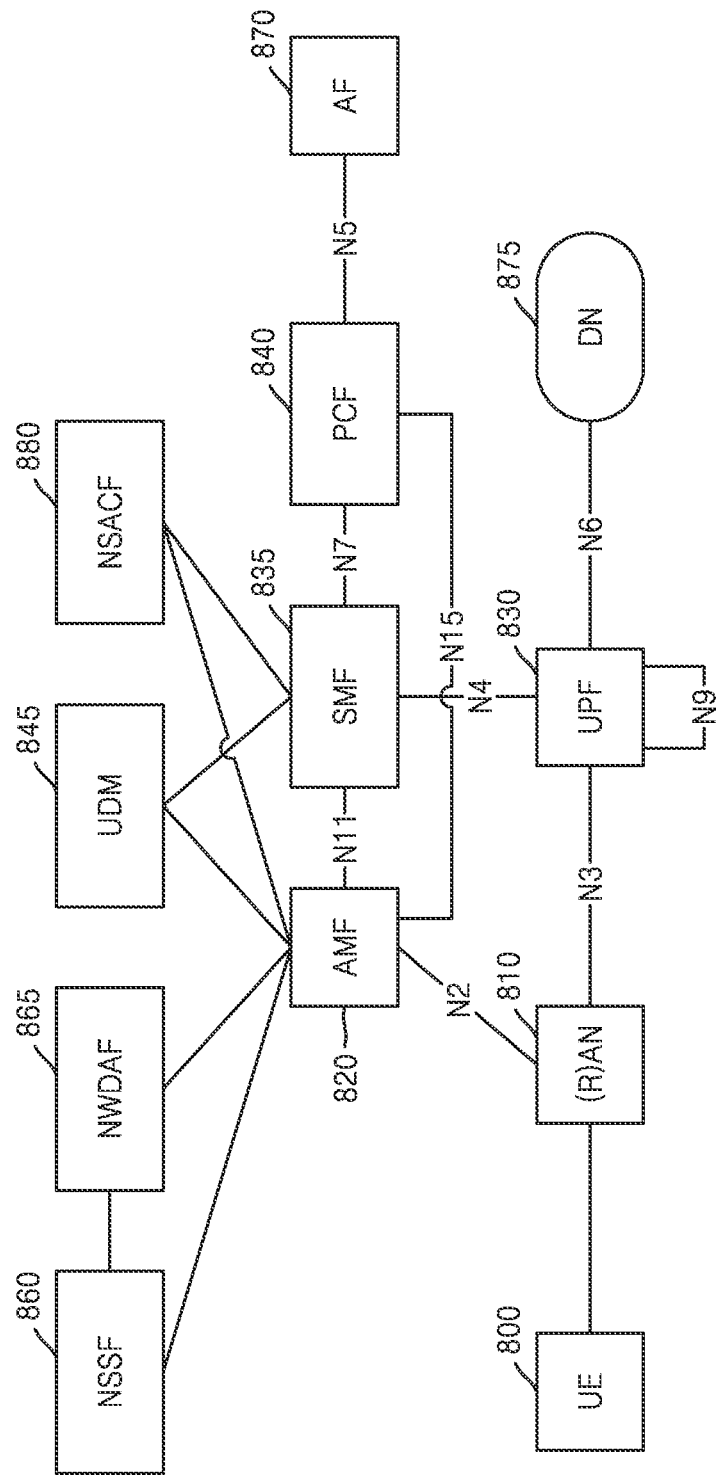
FIG. 8 illustrates a system structure of a 5GS according to an embodiment of the present disclosure.

FIG. 8 illustrates a system structure of a 5GS according to an embodiment of the present disclosure. The 5GS may be configured with a 5G core network, a BS, a UE, or the like. The 5G core network may be configured of an AMF 820, an SMF 835, a UPF 830, a PCF 840, a UDM 845, an NSSF 860, an NWDAF 865, an N3F, or the like.

A UE 800 may access the 5G core network via a radio access network BS 810. The radio access network BS 810 may support a 3GPP access network (e.g., NR, E-UTRA, or the like) type or a non-3GPP access network type. Via the BS 810, the UE 800 may be connected to the AMF 820 with an N2 interface and may be connected to the UPF 830 with an N3 interface. The BS 810 may also be referred to as a base station (BS), an access point (AP), eNodeB (eNB), 5G node, gNodeB (gNB), or another term having same technical meaning. The N3F is an NF that operates as termination of N2 interface and N3 interface for the UE 800 accessing via the non-3GPP access network 811 (e.g., WiFi) not defined in the 3GPP. The N3F may process N2 control plane signaling and N3 user plane packet.

The AMF 820 is an NF that manages wireless network access and mobility with respect to a UE. The SMF 835 is an NF managing a session with respect to a UE, and session information includes QoS information, charging information, packet processing information, or the like.

The UPF 830 is an NF processing user plane traffic and is controlled by the SMF 835. The PCF 840 is an NF that manages an operator policy for providing a service in a wireless communication system. The UDM 845 is an NF that stores and manages UE subscription.

A UDR is an NF that stores and manages data. The UDR may store UE subscription information and may provide the UE subscription information to the UDM 845. Also, the UDR may store operator policy information and may provide the operator policy information to the PCF 840. An NWDAF 865 is an NF that provides analysis information with which a 5G system can operate. The NWDAF 865 may collect data from other NF through OAM which configure the 5G system, may analyze the collected data, and may provide a result of the analysis to the other NF.

An NSACF 880 is an NF that monitors and controls the number of registered UEs and the number of sessions of a network slice that is a target of NSAC. The NSACF 880 stores configuration information about a maximum number of registered UEs and a maximum number of sessions per network slice.

Hereinafter, for convenience of descriptions, entities that exchange information for access control and state management are collectively referred to as an NF. However, embodiments of the disclosure may be equally applied to a case where NFs are actually implemented as instances (an AMF instance, an SMF instance, an NSSF instance, or the like).

In the disclosure, an instance may indicate that a particular NF exists in the form of software code and is executable by receiving allocation of physical and/or logical resources from a particular computing system so as to perform a function of the NF in the computing system existing in a physical computing system, e.g., a core network. Therefore, AMF Instance, SMF Instance, and NSSF Instance may indicate that the AMF Instance, the SMF Instance, and the NSSF Instance are executable by receiving allocation of physical and/or logical resources for AMF, SMF, and NSSF operations, respectively, from a particular computing system existing over a core network. As a result, physical AMF, SMF, and NSSF entities, and the AMF instance, the SMF Instance, and the NSSF Instance which are allocated and use physical and/or logical resources for AMF, SMF, and NSSF operations from a particular computing system existing over a network may perform same operations. Therefore, in an embodiment of the disclosure, features described for an NF (AMF, SMF, UPF, NSSF, NRF, SCP, or the like) may be replaced by an NF instance, or inversely, features described for an NF instance may be replaced by and applied for an NF. Equally, in an embodiment of the disclosure, features described for a network slice may be replaced by a network slice instance, or inversely, features described for a network slice instance may be replaced by and applied for a network slice.

According to an embodiment of the disclosure, in the 5G system defined in the 3GPP, a single network slice may be referred to as single-network slice selection assistance information (S-NSSAI). The S-NSSAI may consist of a value of a slice/service type (SST) and a value of a slice differentiator (SD). The SST may indicate a feature of a service (e.g., enhanced mobile broadband (eMBB), Internet of things (IoT), ultra-reliable and low-latency communications (URLLC), vehicle-to-everything (V2X), etc.) supported by a slice. The value of the SL) may refer to a value to be used as an additional identifier with respect to a particular service indicated by the SST.

NSSAI may include one or more S-NSSAIs. Examples of the NSSAI may include, but are not limited to, configured NSSAI stored in a UE, requested NSSAI requested by a UE, allowed NSSAI allowed for usage by a UE, that is determined by an NF (e.g., an AMF, an NSSF, etc.) of a 5G core network, and subscribed NSSAI to which a UE subscribes.

The UE 800 may be simultaneously connected to the access network 810 and thus may be registered in the 5G system. In particular, the UE 800 may perform a registration procedure with the AMF 820 by accessing the BS 810. In the registration procedure, the AMF 820 may determine and allocate allowed NSSAI to the UE 800, the allowed NSSAI being usable by the UE 800 accessing the BS 810.

Figure 9:
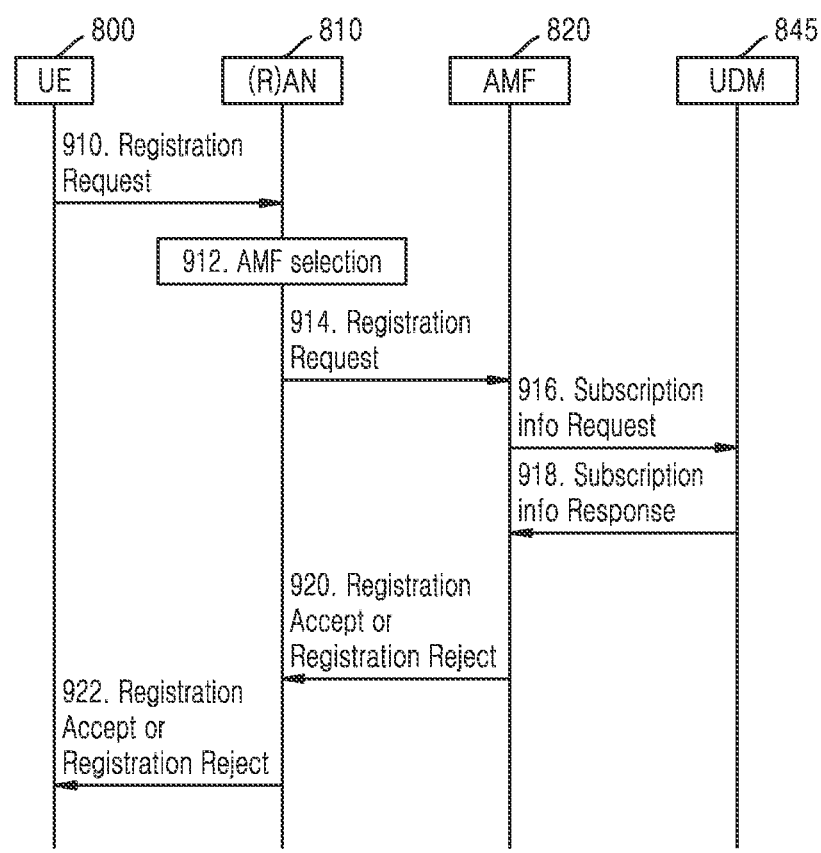
FIG. 9 illustrates a UE registration procedure according to an embodiment of the present disclosure.

FIG. 9 illustrates a UE registration procedure according to an embodiment of the present disclosure. Referring to FIG. 9, the UE 800 according to an embodiment of the disclosure may perform a registration procedure with the AMF 820 by accessing the BS 810.

Operation 910: The UE 800 may access the BS 810 and then may transmit a registration request message. The registration request message may include information about requested NSSAI (e.g., S-NSSAI A) the UE 800 attempts to use.

Operation 912: According to an embodiment of the disclosure, when the BS 810 receives the registration request message, the BS 810 may select the AMF 820 to which the registration request is to be transmitted, based on the requested NSSAI received from the UE 800. For example, the BS 810 may select the AMF 820 capable of supporting the requested NSSAI.

Operation 914: The BS 810 may transmit the registration request message to the AMF 820 selected in operation 912. The AMF 820 may need to obtain UE subscription information to process the registration request message.

Operation 916: The AMF 820 may request the UDM 845 for the UE subscription information. A UE subscription information request message may include UE ID (e.g. SUPI, 5G-GUTI, or the like).

Operation 918: The UDM 845 may transmit, as a response, the UE subscription information corresponding to the UE ID to the AMF 820. The UE subscription information may include information about slices (subscribed S-NSSAIs) to which the UE 800 subscribes.

Operation 920: The AMF 820 may determine an allowed slice (allowed NSSAI), based on at least one of the requested NSSAI by the UE 800, subscribed S-NSSAIs of the UE 800, a 3GPP access network accessed by the UE 800, a network slice supported by the BS 810 (S-NSSAI supported by RAN), or an operator policy.

For example, when the requested NSSAI by the UE 800 (e.g., S-NSSAI A) is included in the subscribed S-NSSAIs of the UE 800 and is included in the network slice supported by the BS 810 (S-NSSAI supported by RAN), the AMF 820 may determine to include the requested NSSAI by the UE 800 in the allowed slice (e.g., S-NSSAI A).

The AMF 820 may determine whether S-NSSAI included in the allowed slice is S-NSSAI that is a target of NSAC, based on configuration information stored in the AMF 820. For example, the configuration information may include information indicating which S-NSSAI is a target of NSAC.

When S-NSSAI included in the allowed slice is S-NSSAI that is a target of NSAC, the AMF 820 may check slice availability with the NSACF 880 of the 5G core network before the AMF 820 determines to allow the allowed slice for the UE 800. When the number of UEs registered in the S-NSSAI is less than a maximum number of registered UEs, the NSACF 880 may transmit availability of the slice to the AMF 820. When availability of the S-NSSAI is received from the NSACF 880, the AMF 820 may determine to include the S-NSSAI in the allowed slice.

According to another example, even when S-NSSAI included in the allowed slice is S-NSSAI that is a target of NSAC, based on the operator policy, the AMF 820 may exempt the NSAC. For example, the AMF 820 may determine to exempt, from NSAC, S-NSSAI associated with PDN connection (PDU session) handed over from an EPC. The meaning of the exemption of the NSAC is that a procedure for checking slice availability with the NSACF 880 is not performed (is skipped), and corresponding S-NSSAI is included in the allowed slice. The AMF 820 may store, as UE context, information indicating that the S-NSSAI is exempted from NSAC. Also, the UE context may include PDU session information (e.g., PDU session ID(s), or the like) that is an exemption target of NSAC. Accordingly, the AMF 820 may skip a subsequent procedure for checking, with the NSACF 880, slice availability of corresponding S-NSSAI.

If S-NSSAI requested by the UE 800 is not included in the allowed slice, the AMF 820 may include the S-NSSAI in rejected slices (rejected S-NSSAIs).

The AMF 820 may transmit a registration accept message or a registration reject message to the BS 810, in response to the registration request message received in operation 814. The registration accept message may include information about at least one of the allowed slice (allowed NSSAI) or the rejected slice (rejected NSSAI). If there is no slice available for the UE 800, i.e., if there is no allowed slice, the AMF 820 may transmit the registration reject message.

Operation 922: The BS 810 may transmit, to the UE 800, the registration accept message or the registration reject message received from the AMF 820. When the UE 800 receives the registration accept message, the UE 800 may store the allowed slice and/or the rejected slice included in the registration accept message. Also, the UE 800 may establish a PDU session by using the received allowed slice in communication thereafter.

Figure 10:
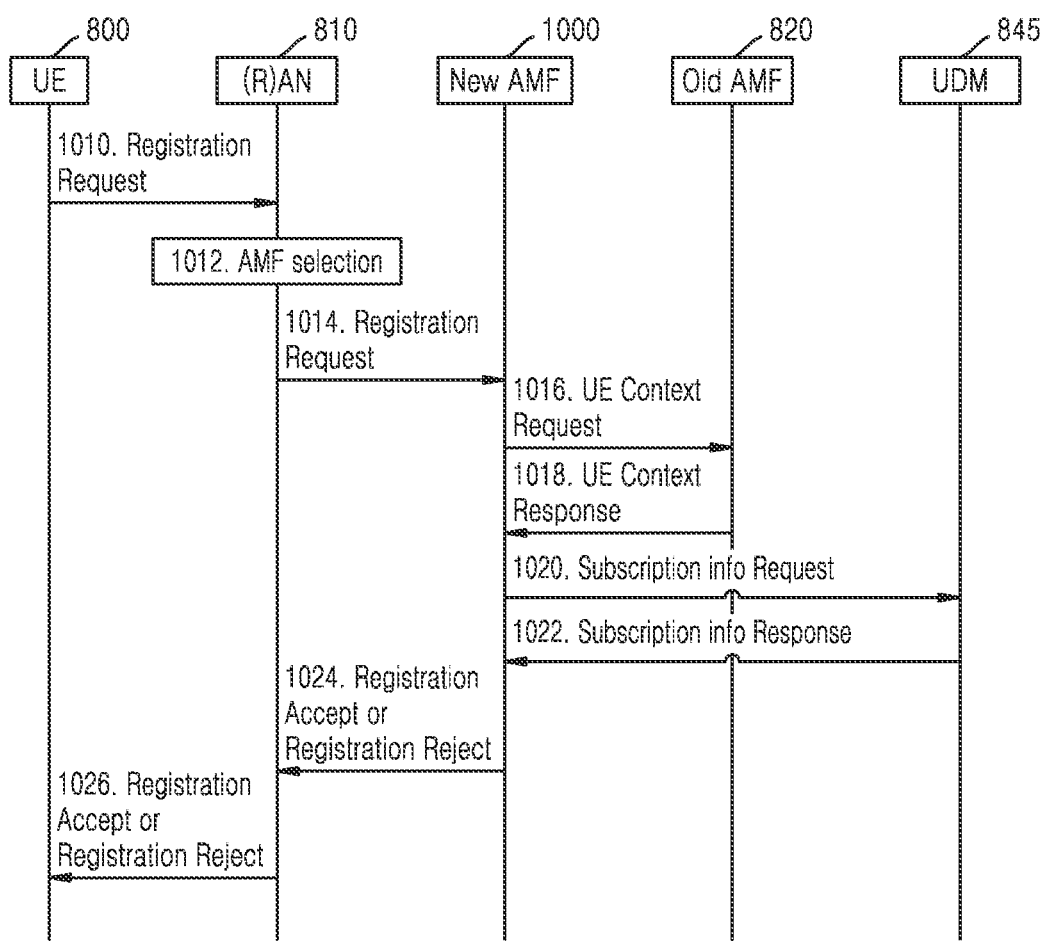
FIG. 10 illustrates a procedure for changing an access and mobility management function (AMF) of a registered UE according to an embodiment of the present disclosure.

FIG. 10 illustrates a procedure for changing an AMF of a registered UE according to an embodiment of the present disclosure.

In operation 1010: The UE 800 registered in a network via the procedure illustrated in FIG. 9 may transmit a registration request message due to various reasons. For example, the UE 800 may transmit the registration request message to change a position due to movement of the UE 800 or to change a slice to be used. The registration request message may include at least one of UE ID (e.g., 5G-GUTI, or the like) or requested NSSAI.

In operation 1012: The BS 810 may select an AMF 1000, based on information received from the UE 800. Here, the AMF 1000 selected by the BS 810 may be an AMF different from the AMF 820 that processes the Registration request by the UE 800 in FIG. 9.

Operation 1014: The AMF 1000 may process the received registration request message. In order to process the received registration request message, the AMF 1000 may determine to obtain UE context and/or UE subscription information.

Operation 1016: The AMF 1000 may request UE context from the old AMF 820 that previously serves the UE 800. A request message may include UE ID.

Operation 1018: The old AMF 820 may transmit, to the AMF 1000, UE context of the UE 800 indicated by the UE ID. The UE context transmitted from the old AMF 820 to the AMF 1000 may include information about S-NSSAI exempted from NSAC. Also, the UE context may include information (e.g., PDU session ID(s), or the like) about PDU session that is an exemption target of NSAC.

Operation 1020: The AMF 1000 may request the UDM 845 for UE subscription information. A UE subscription information request message may include UE ID (e.g., SUPI, 5G-GUTI, or the like).

Operation 1022: The UDM 845 may transmit, to the AMF 1000, the UE subscription information corresponding to the UE ID. The UE subscription information may include information about slices (subscribed S-NSSAIs) to which the UE 800 subscribes.

Operation 1024: The AMF 1000 may determine an allowed slice (allowed NSSAI), based on at least one of requested NSSAI by the UE 800, subscribed S-NSSAIs of the UE 800, a 3GPP access network accessed by the UE 800, a network slice supported by the BS 810 (S-NSSAI supported by RAN), an operator policy, or the UE context received from the old AMF 820.

For example, the AMF 1000 may determine whether S-NSSAI included in the allowed slice is S-NSSAI that is a target of NSAC, based on configuration information stored in the AMF 1000. For example, the configuration information may include information indicating which S-NSSAI is a target of NSAC.

When S-NSSAI included in the allowed slice is S-NSSAI that is a target of NSAC, the AMF 1000 may check slice availability with the NSACF 880 of the 5G core network before the AMF 1000 determines to allow the allowed slice for the UE 800. When the number of UEs registered in the S-NSSAI is less than a maximum number of registered UEs, the NSACF 880 may transmit availability of the slice to the AMF 1000. When availability of the S-NSSAI is received from the NSACF 880, the AMF 1000 may determine to include the S-NSSAI in the allowed slice.

According to another example, even when S-NSSAI included in the allowed slice is S-NSSAI that is a target of NSAC, based on the UE context, the AMF 1000 may exempt the NSAC. For example, when information indicating that the S-NSSM is exempted from NSAC is included in the UE context, the AMF 1000 may determine to exempt the S-NSSAI from NSAC. Accordingly, the AMF 1000 may not perform (may skip) a procedure for checking slice availability with the NSACF 880, and may determine to include the corresponding S-NSSAI in the allowed slice.

When the UE context includes information indicating that the S-NSSAI is exempted, the AMF 1000 may store, as UE context, information indicating that the S-NSSAI is exempted from NSAC. Accordingly, the AMF 1000 may skip a subsequent procedure for checking, with the NSACF 880, slice availability of corresponding S-NSSAI.

If S-NSSAI requested by the UE 800 is not included in the allowed slice, the AMF 1000 may include the S-NSSAI in rejected slices (rejected S-NSSAIs).

The AMF 1000 may transmit a registration accept message or a registration reject message to the BS 810, in response to the registration request message received in operation 1014. The registration accept message may include information about at least one of the allowed slice (allowed NSSAI) or the rejected slice (rejected NSSAI). If there is no slice available for the UE 800, i.e., if there is no allowed slice, the AMF 1000 may transmit the registration reject message.

Operation 1026: The BS 810 may transmit, to the UE 800, the registration accept message or the registration reject message received from the AMF 1000. When the UE 800 receives the registration accept message, the UE 800 may store the allowed slice and/or the rejected slice included in the registration accept message. Also, the UE 800 may establish a PDU session by using the received allowed slice in communication thereafter.

Figure 11:
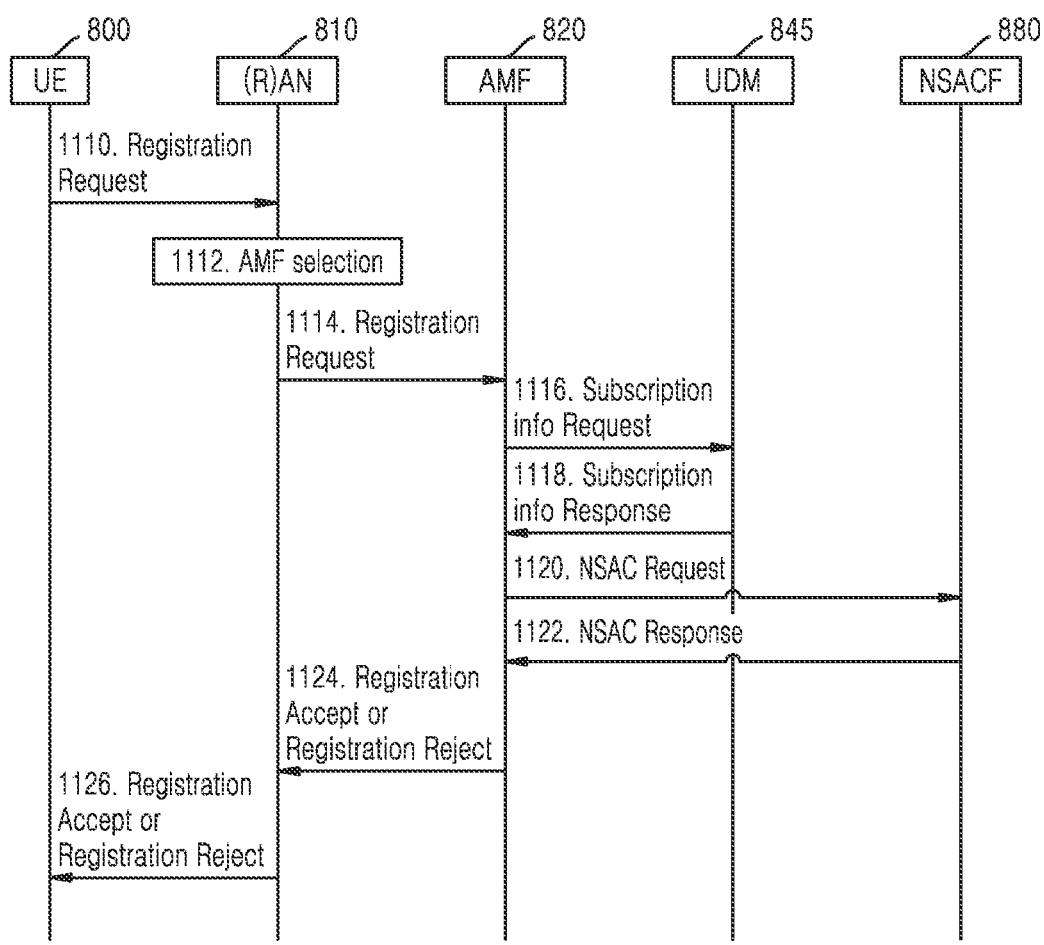
FIG. 11 illustrates a UE registration procedure according to another embodiment of the present disclosure.

FIG. 11 illustrates a UE registration procedure according to another embodiment of the present disclosure.

Operation 1110: The UE 800 may access the BS 810 and then may transmit a registration request message. The registration request message may include information about requested NSSAI (e.g., S-NSSAI A) the UE 800 attempts to use.

Operation 1112: According to an embodiment of the disclosure, when the BS 810 receives the registration request message, the BS 810 may select the AMF 820 to which the registration request is to be transmitted, based on the requested NSSAI received from the UE 800. For example, the BS 810 may select the AMF 820 capable of supporting the requested NSSAI.

Operation 1114: The BS 810 may transmit the registration request message to the AMF 820 selected in operation 1112. The AMF 820 may need to obtain UE subscription information to process the registration request message.

Operation 1116: The AMF 820 may request the UDM 845 for the UE subscription information. A UE subscription information request message may include UE ID (e.g. SUPI, 5G-GUTI, or the like).

Operation 1118: The UDM 845 may transmit, as a response, the UE subscription information corresponding to the UE to the AMF 820. The UE subscription information may include information about slices (subscribed S-NSSAIs) to which the UE 800 subscribes.

The AMF 820 may determine an allowed slice (allowed NSSAI), based on at least one of the requested NSSAI by the UE 800, subscribed S-NSSAIs of the UE 800, a 3GPP access network accessed by the UE 800, a network slice supported by the BS 810 (S-NSSAI supported by RAN), or an operator policy.

For example, when the requested NSSAI by the UE 800 (e.g., S-NSSAI A) is included in the subscribed S-NSSAIs of the UE 800 and is included in the network slice supported by the BS 810, the AMF 820 may determine to include the requested NSSAI by the UE 800 in the allowed slice (e.g., S-NSSAI A).

The AMF 820 may determine whether S-NSSAI included in the allowed slice is S-NSSAI that is a target of NSAC, based on configuration information stored in the AMF 820. For example, the configuration information may include information indicating which S-NSSAI is a target of NSAC.

When S-NSSAI included in the allowed slice is S-NSSAI that is a target of NSAC, the AMF 820 may check slice availability with the NSACF 880 of the 5G core network before the AMF 820 determines to allow the allowed slice for the UE 800. When the number of UEs registered in the S-NSSAI is less than a maximum number of registered UEs, the NSACF 880 may transmit availability of the slice to the AMF 820. When availability of the S-NSSAI is received from the NSACF 880, the AMF 820 may determine to include the S-NSSAI in the allowed slice.

According to another example, even when S-NSSAI included in the allowed slice is S-NSSAI that is a target of NSAC, based on the operator policy, the AMF 820 may exempt the NSAC. For example, the AMF 820 may determine to exempt, from NSAC, S-NSSAI associated with PDN connection handed over from an EPC. The meaning of the exemption of the NSAC is that, in a procedure for checking slice availability with the NSACF 880, information about the S-NSSAI exempted from NSAC is notified to the NSACF 880.

Operation 1120: The AMF 820 may transmit an NSAC request message to the NSACF 880.

The NSAC request message may include at least one of S-NSSAI information that is a target of NSAC, UE ID, or an indicator indicating an increase or a decrease in a current number of UEs. The NSACF 880 may process the NSAC request message. For example, when the NSAC request message includes an indicator indicating the number of UEs, the NSACF 880 may compare a current number of registered UEs with a maximum number of registered UEs, and when the current number of registered UEs does not reach the maximum number of registered UEs, the NSACF 880 may increase the current number of registered UEs which corresponds to S-NSSAI and is stored/managed by the NSACF 880. Also, the NSACF 880 may store UE ID registered in the S-NSSAI. If the NSACF 880 compares the current number of registered UEs with the maximum number of registered UEs, and when the current number of registered UEs does reaches the maximum number of registered UEs (or the current number of registered UEs exceeds the maximum number of registered UEs), the NSACF 880 may determine that an increase in the current number of registered UEs is no more available. That is, in this case, the NSACF 880 may not be able to successfully process the request received from the AMF 820.

According to another embodiment of the disclosure, the NSAC request message may include information about S-NSSAI that is a target of NSAC (or information about S-NSSAI exempted from a target of NSAC), UE ID, or an indicator indicating NSAC exemption. The NSACF 880 may process the NSAC request message. For example, as the S-NSSAI included in the NSAC request message is exempted from the NSAC, the NSACF 880 may not change the current number of registered UEs which corresponds to the S-NSSAI. Also, the NSACF 880 may store UE ID for the S-NSSAI exempted from the NSAC.

Operation 1122: The NSACF 880 may transmit an NSAC response message to the AMF 820. The NSAC response message may include information indicating a result of processing the NSAC request message in operation 1120. The NSAC response message may include at least one of information about an NSAC-target slice (e.g., S-NSSAI, requested NSSAI, allowed NSSAI, subscribed S-NSSAI, or the like) or availability of the NSAC-target slice (e.g. indication indicating availability or not-availability, a cause value, or the like). For example, when a request of S-NSSAI exempted from NSAC is processed, the NSACF 880 may include information indicating that a slice is available. Alternatively, the NSACF 880 may include information indicating that the S-NSSAI is exempted from NSAC. Alternatively, when the current number of registered UEs exceeds the maximum number of registered UEs and thus an increase in the current number of registered UEs is no longer available, the NSAC response message may include information indicating that the slice is not available.

Operation 1124: The AMF 820 may determine the allowed slice, according to the slice availability received from the NSACF 880.

For example, when the information indicating that the slice (S-NSSAI) is available or the information indicating that the S-NSSAI is exempted is received from the NSACF 880, the AMF 820 may include the slice (S-NSSAI) in the allowed slice. Alternatively, for example, when not-availability of the slice (S-NSSAI) is received from the NSACF 880, the AMF 820 may not include the slice (S-NSSAI) in the allowed slice. In addition, the AMF 820 may include the slice (S-NSSAI) in a rejected slice (rejected NSSAI). Alternatively, for example, when the NSACF 880 transmits the information indicating that the slice (S-NSSAI) that has been determined to be exempted from NSAC is not available (has failed), the AMF 820 may determine to ignore a response (non-availability of the slice) received from the NSACF 880 as the AMF 820 determined to exempt NSAC even when the slice is not available. That is, as the AMF 820 determined to exempt NSAC even when the slice is not available, the AMF 820 may include the slice (S-NSSAI) in the allowed slice. The AMF 820 may store, as UE context, information indicating that the S-NSSAI is not available but is stored in the allowed slice. Also, the UE context may include PDU session information (e.g., PDU session ID(s), or the like) that is an exemption target of NSAC.

When the information indicating that the S-NSSAI is exempted is received from the NSACF 880, the AMF 820 may store, as UE context, the information indicating that the S-NSSAI is exempted from NSAC. Also, the UE context may include PDU session information (e.g., PDU session ID(s), or the like) that is an exemption target of NSAC. Accordingly, the AMF 820 may skip a subsequent procedure for checking, with the NSACF 880, slice availability of corresponding S-NSSAI.

The AMF 820 may transmit a registration accept message or a registration reject message to the BS 810, in response to the registration request message received in operation 1114. The registration accept message may include information about at least one of the allowed slice (allowed NSSAI) or the rejected slice (rejected NSSAI). If there is no slice available for the UE 800, i.e., if there is no allowed slice, the AMF 820 may transmit the registration reject message.

Operation 1126: The BS 810 may transmit, to the UE 800, the registration accept message or the registration reject message received from the AMF 820. When the UE 800 receives the registration accept message, the UE 800 may store the allowed slice and/or the rejected slice included in the registration accept message. Also, the UE 800 may establish a PDU session by using the received allowed slice in communication thereafter.

Figure 12:
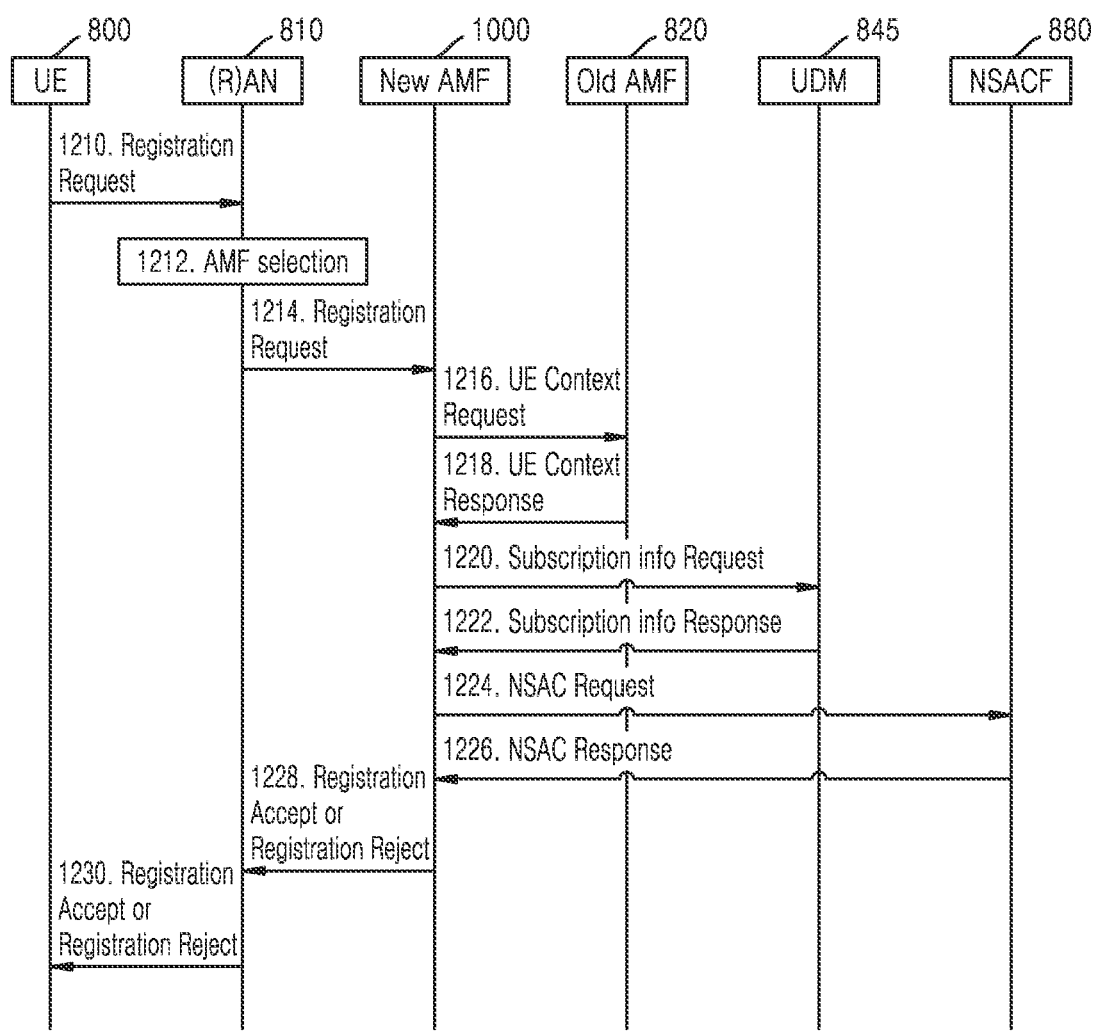
FIG. 12 illustrates a procedure for changing an AMF of a registered UE according to another embodiment of the present disclosure.

FIG. 12 illustrates a procedure for changing an AMF of a registered UE according to another embodiment of the present disclosure.

In operation 1210: The UE 800 registered in a network via the procedure illustrated in FIG. 11 may transmit a registration request message due to various reasons. For example, the UE 800 may transmit the registration request message to change a position due to movement of the UE 800 or to change a slice to be used. The registration request message may include at least one of UE ID (e.g., SUPI, 5G-GUTI or the like) or requested NSSAI.

In operation 1212: The BS 810 may select the AMF 1000, based on information received from the UE 800. Here, the AMF 1000 selected by the BS 810 may be an AMF different from the AMF 820 that processes the registration request by the UE 800 in FIG. 11.

Operation 1214: The AMF 1000 may process the received registration request message. In order to process the received registration request message, the AMF 1000 may determine to obtain UE context and/or UE subscription information.

Operation 1216: The AMF 1000 may request UE context from the old AMF 820 that previously serves the UE 800. A request message may include UE Operation 1218: The old AMF 820 may transmit, to the AMF 1000, UE context of the UE 800 indicated by the UE ID. When the old AMF 820 includes a slice (S-NSSAI) in an allowed slice even when the slice is not available, UE context may include information indicating that the S-NSSAI is include in the allowed slice even when the S-NSSAI is not available. Also, the UE context may include information (e.g., PDU session ID(s), or the like) about PDU session that is an exemption target of NSAC.

Operation 1220: The AMF 1000 may request the UDM 845 for UE subscription information. A UE subscription information request message may include UE ID (e.g., SUPI, 5G-GUTI, or the like).

Operation 1222: The UDM 845 may transmit, to the AMF 1000, the UE subscription information corresponding to the UE ID. The UE subscription information may include information about slices (subscribed S-NSSAIs) to which the UE 800 subscribes.

Operation 1224: The AMF 1000 may determine an allowed slice (allowed NSSAI), based on at least one of requested NSSAI by the UE 800, subscribed S-NSSAIs of the UE 800, a 3GPP access network accessed by the UE 800, a network slice supported by the BS 810 (S-NSSAI supported by RAN), an operator policy, or the UE context received from the old AMF 820.

For example, the AMF 1000 may determine whether S-NSSAI included in the allowed slice is S-NSSAI that is a target of NSAC, based on configuration information stored in the AMF 1000. For example, the configuration information may include information indicating which S-NSSAI is a target of NSAC.

When S-NSSAI included in the allowed slice is S-NSSAI that is a target of NSAC, the AMF 1000 may check slice availability with the NSACF 880 of the 5G core network before the AMF 1000 determines to allow the allowed slice for the UE 800.

In order to check the slice availability, the AMF 1000 may transmit an NSAC request message to the NSACF 880. The NSAC request message may include at least one of S-NSSAI information that is a target of NSAC, UE ID, or an indicator indicating an increase or a decrease in a current number of UEs. The NSACF 880 may process the NSAC request message. For example, the NSACF 880 may check information associated with UE ID included in the NSAC request message, the UE ID being among UE IDs stored in the NSACF 880. If S-NSSAI information exempted from NSAC is stored with respect to the received UE ID, and the stored S-NSSAI information exempted from NSAC is equal to the received S-NSSAI, the NSACF 880 may identify that the S-NSSAI included in the NSAC request message is a slice exempted from NSAC. Accordingly, as the S-NSSAI included in the NSAC request message is exempted from NSAC, the NSACF 880 may not change the current number of registered UEs which corresponds to the S-NSSAI.

Operation 1226: The NSACF 880 may transmit an NSAC response message to the AMF 1000. The NSAC response message may include information indicating a result of processing the NSAC request message in operation 1224. The NSAC response message may include at least one of information about an NSAC-target slice (e.g., S-NSSAI, requested NSSAI, allowed NSSAI, subscribed S-NSSAI, or the like) or availability of the NSAC-target slice (e.g. indication indicating availability or not-availability, a cause value, or the like). For example, when a request of S-NSSAI exempted from NSAC is processed, the NSACF 880 may include information indicating that a slice is available. Alternatively, the NSACF 880 may include information indicating that the S-NSSAI is exempted from NSAC. Alternatively, when the current number of registered UEs exceeds the maximum number of registered UEs and thus an increase in the current number of registered UEs is no longer available, the NSAC response message may include information indicating that the slice is not available.

Operation 1228: The AMF 1000 may determine the allowed slice, according to the slice availability received from the NSACF 880. For example, when the information indicating that the slice (S-NSSAI) is available or the information indicating that the S-NSSAI is exempted is received from the NSACF 880, the AMF 1000 may include the slice (S-NSSAI) in the allowed slice. If UE context includes information indicating that S-NSSAI is included in the allowed slice even when the S-NSSAI is not available and/or PDU session information (e.g., PDU session ID(s), or the like) that is an exemption target of NSAC, the AMF 1000 may delete the information from the UE context.

Alternatively, for example, when not-availability of the slice (S-NSSAI) is received from the NSACF 880, the AMF 1000 may not include the slice (S-NSSAI) in the allowed slice. In addition, the AMF 1000 may include the slice (S-NSSAI) in a rejected slice (rejected NSSAI). If the UE context includes the information indicating that the S-NSSAI is included in the allowed slice even when the S-NSSAI is not available, the AMF 1000 may determine to ignore a response (non-availability of the slice) received from the NSACF 880. That is, the AMF 1000 may include the slice (S-NSSAI) in the allowed slice. Also, the AMF 1000 may changelessly maintain the information indicating that the S-NSSAI is included in the allowed slice even when the S-NSSAI is not available.

When the information indicating that the S-NSSAI is exempted is received from the NSACF 880, the AMF 1000 may store, as UE context, the information indicating that the S-NSSAI is exempted from NSAC. Also, the UE context may include PDU session information (e.g., PDU session ID(s), or the like) that is an exemption target of NSAC. Accordingly, the AMF 1000 may skip a subsequent procedure for checking, with the NSACF 880, slice availability of corresponding S-NSSAI.

The AMF 1000 may transmit a registration accept message or a registration reject message to the BS 810, in response to the registration request message received in operation 1114. The registration accept message may include information about at least one of the allowed slice (allowed NSSAI) or the rejected slice (rejected NSSAI). If there is no slice available for the UE 800, i.e., if there is no allowed slice, the AMF 1000 may transmit the registration reject message.

Operation 1230: The BS 810 may transmit, to the UE 800, the registration accept message or the registration reject message received from the AMF 1000. When the UE 800 receives the registration accept message, the UE 800 may store the allowed slice and/or the rejected slice included in the registration accept message. Also, the UE 800 may establish a PDU session by using the received allowed slice in communication thereafter.

In operation thereafter, the UE 800 may release a PDU session that is an exemption target of NSAC. When all PDU sessions that are an exemption target of NSAC, which are stored as UE context, are released, the AMF 1000 may delete, from the UE context, the information indicating that S-NSSAI is included in the allowed slice even when the S-NSSAI is not available and/or the PDU session information (e.g., PDU session ID(s), or the like) that is an exemption target of NSAC.

Figure 13:
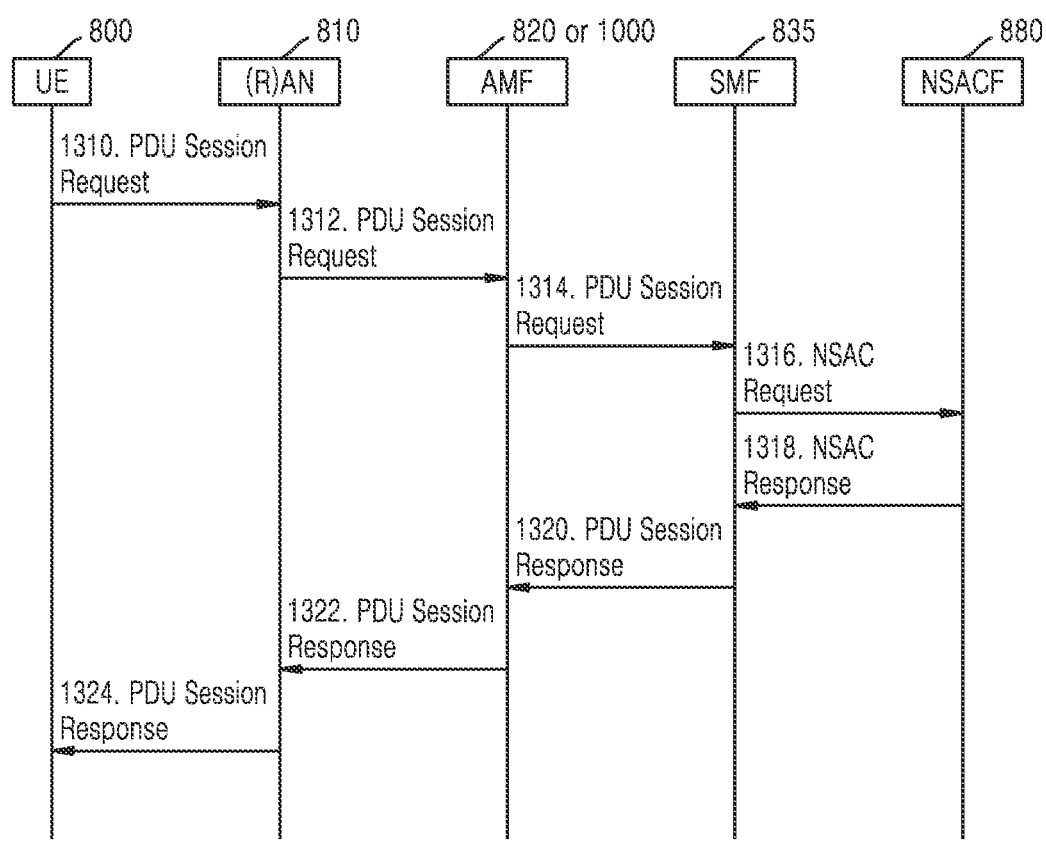
FIG. 13 illustrates a procedure for establishing a protocol data unit (PDU) session according to an embodiment of the present disclosure.

FIG. 13 illustrates a PDU session establishment procedure according to an embodiment of the present disclosure.

Operation 1310: The UE 800 registered in a network via a procedure illustrated in FIGS. 9 to 12 may access the BS 810 and may transmit a PDU session request message. The PDU session request message may include a slice (e.g., S-NSSAI A) the UE 800 attempts to use. The slice may be one of one or more S-NSSAIs included in an allowed slice.

Operation 1312: According to an embodiment of the disclosure, the BS 810 having received the PDU session request message may transmit a PDU session request to the AMF 820 or 1000 that serves the UE 800.

According to various embodiments described in the disclosure, the AMF 820 or 1000 may determine whether S-NSSAI requested by the UE 800 is S-NSSAI that is a target of NSAC.

Also, even when the S-NSSAI requested by the UE 800 is S-NSSAI that is a target of NSAC, the AMF 820 or 1000 may determine to exempt the NSAC. For example, even when the S-NSSAI requested by the UE 800 is S-NSSAI that is a target of NSAC, based on an operator policy, the AMF 820 or 1000 may determine to exempt the NSAC. Alternatively, even when the S-NSSAI requested by the UE 800 is S-NSSAI that is a target of NSAC, if UE context stored in the AMF 820 or 1000 includes information indicating that the corresponding S-NSSAI is exempted from NSAC, the AMF 820 or 1000 may determine to exempt the NSAC. The AMF 820 or 1000 may store, as UE context, information indicating that the corresponding S-NSSAI is exempted from NSAC.

Operation 1314: The AMF 820 or 1000 may transmit a PDU session request message to the SMF 835. The PDU session request message may include the S-NSSAI requested by the UE 800. If the S-NSSAI requested by the UE 800 is exempted from NSAC, the PDU session request message may include information (indicator) indicating that the S-NSSAI is exempted from NSAC.

The SMF 835 having received the PDU session request message from the AMF 820 or 1000 may determine whether the received S-NSSAI is a target of NSAC. If the received S-NSSAI is a target of NSAC, the SMF 835 may perform operations 1316 to 1318, thereby checking slice availability with the NSACF 880. If the received S-NSSAI is exempted from NSAC, the SMF 835 may skip a procedure for checking slice availability with the NSACF 880, i.e., operations 1316 to 1318.

Operation 1316: When the received S-NSSAI is a target of NSAC, the SMF 835 may transmit an NSAC request message to the NSACF 880. The NSAC request message may include at least one of information about the S-NSSAI that is a target of NSAC, UE ID, PDU session ID, or an indicator indicating an increase or a decrease in a current number of UEs. The NSACF 880 may process the NSAC request message. For example, when an indicator indicating an increase in the number of sessions is included in the NSAC request message, the NSACF 880 may increase a current number of sessions corresponding to S-NSSAI stored/managed by the NSACF 880. Also, the NSACF 880 may store UE ID and/or PDU session ID registered in S-NSSAI.

Operation 1318: The NSACF 880 may transmit an NSAC response message to the SMF 835. The NSAC response message may include information indicating a result of processing the NSAC request message in operation 1316. For example, when the current number of sessions is increased in response to the request by the SMF 835, the NSACF 880 may include information indicating that a slice is available.

Operation 1320: When the S-NSSAI requested by the UE 800 is exempted from NSAC in operation 1314 or based on the result of processing the NSAC request message received from the NSACF 880 in operation 1318, the SMF 835 may process a PDU session request. For example, when the S-NSSAI requested by the UE 800 is exempted from NSAC in operation 1314 or when the information indicating that a slice is available is received from the NSACF 880 in operation 1318, the SMF 835 may determine to allow establishment of a PDU session to the corresponding S-NSSAI. The SMF 835 may transmit a PDU session response message to the AMF 820 or 1000.

Operation 1322: The AMF 820 or 1000 may transmit the PDU session response message to the UE 800 via the BS 810.

Operation 1324: The BS 810 may transmit, to the UE 800, the PDU session response message received from the AMF 820 or 1000. The UE 800 having received the PDU session response message may transmit and receive data by using the PDU session established in association with the S-NSSAI.

Figure 14:
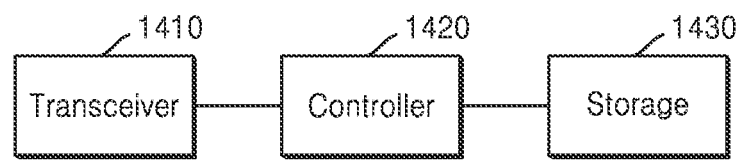
FIG. 14 illustrates a structure of a UE according to an embodiment of the present disclosure.

FIG. 14 illustrates a structure of a UE according to an embodiment of the present disclosure.

Referring to FIG. 14, the UE may include a transceiver 1410, a controller 1420, and a storage 1430. In the disclosure, the controller 1420 may be defined as a circuit, an application-specific integrated circuit or at least one processor.

The transceiver 1410 may transmit and receive signals to and from another network entity. For example, the transceiver 1410 may receive system information and may receive a synchronization signal or a reference signal, from a BS.

The controller 1420 may control general operations of the UE according to embodiments provided in the disclosure. For example, the controller 1420 may control a signal flow between blocks so as to perform operations according to flowcharts described above.

The storage 1430 may store at least one of information transmitted/received via the transceiver 1410 or information generated by the controller 1420.

Figure 15:
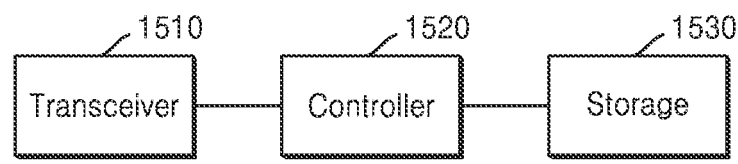
FIG. 15 illustrates a structure of a network entity according to an embodiment of the present disclosure.

FIG. 15 illustrates a structure of a network entity according to an embodiment of the present disclosure.

Referring to FIG. 15, the network entity may include a transceiver 1510, a controller 1520, and a storage 1530. In the disclosure, the controller 1520 may be defined as a circuit, an application-specific integrated circuit or at least one processor.

The transceiver 1510 may transmit and receive signals to and from another network entity.

The controller 1520 may control general operations of the network entity according to embodiments provided in the disclosure. For example, the controller 1520 may control a signal flow between blocks so as to perform operations according to flowcharts described above.

The storage 1530 may store at least one of information transmitted/received via the transceiver 1510 or information generated by the controller 1520.

A network slicing technology has been introduced to support various services in various network structures. The network slicing refers to a technology for logically configuring a network with a set of NFs to support a particular service, and separating a slice from other slice. When one UE receives various services, the UE may access two or more slices. When there is a need to adjust a total number for slices via an NSAC procedure, a quota check may be performed on S-NSSAI (e.g., when a session associated with S-NSSAI is handed over from an evolved packet core (EPC) to a 5GC), and in response to a result thereof, a problem may occur as continuity of a service is not supported.

In order to solve the problem, the disclosure provides a method of processing a control signal in a wireless communication system, the method including: receiving a first control signal transmitted from a BS; processing the received first control signal; and transmitting, to the BS, a second control signal generated based on the processing.

According to an embodiment of the disclosure, in a situation where a total amount of slices is adjusted via an NSAC procedure in a wireless communication system, a case where service continuity is not supported depending on a result of a quota check with respect to S-NSSAI (e.g., a case where a session associated with S-NSSAI is handed over from an EPC to a 5GC) may be prevented, and an NSAC procedure exemption service to support service continuity may be provided.

Figure 16:
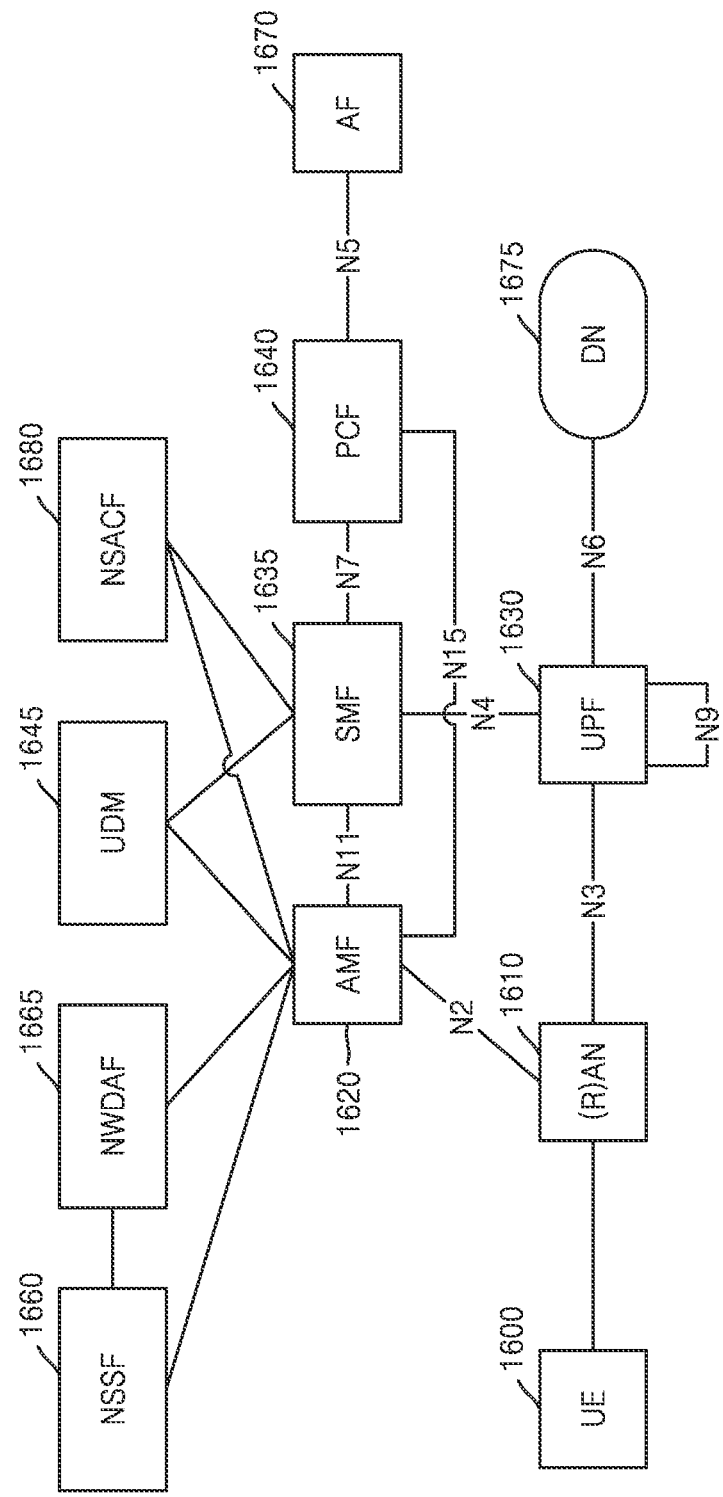
FIG. 16 illustrates a system structure of a 5GS according to an embodiment of the present disclosure.

FIG. 16 illustrates a system structure of a 5GS according to an embodiment of the present disclosure. The 5GS may be configured with a 5G core network, a BS, a UE, or the like. The 5G core network may be configured of an AMF 1620, an SMF 1635, a UPF 1630, a PCF 1640, a UDM 1645, an NSSF 1660, an NWDAF 1665, an N3F, or the like.

A UE 1600 may access the 5G core network via a radio access network BS 1610. The radio access network BS 1610 may support a 3GPP access network (e.g., NR, E-UTRA, or the like) type or a non-3GPP access network type. Via the BS 1610, the UE 1600 may be connected to the AMF 1620 with an N2 interface and may be connected to the UPF 1630 with an N3 interface. The BS 1610 may also be referred to as a base station (BS), an access point (AP), eNodeB (eNB), 5G node, gNodeB (gNB), or another term having same technical meaning. The N3F is an NF that operates as termination of N2 interface and N3 interface for the UE 800 accessing via the non-3GPP access network 1611 (e.g., WiFi) not defined in the 3GPP. The N3F may process N2 control plane signaling and N3 user plane packet.

The AMF 1620 is an NF that manages wireless network access and mobility with respect to a UE. The SMF 1635 is an NF managing a session with respect to a UE, and session information includes QoS information, charging information, packet processing information, or the like.

The UPF 1630 is an NF processing user plane traffic and is controlled by the SMF 1635. The PCF 1640 is an NF that manages an operator policy for providing a service in a wireless communication system. The UDM 1645 is an NF that stores and manages UE subscription.

A UDR is an NF that stores and manages data. The UDR may store UE subscription information and may provide the UE subscription information to the UDM 1645. Also, the UDR may store operator policy information and may provide the operator policy information to the PCF 1640. An NWDAF 1665 is an NF that provides analysis information with which a 5G system can operate. The NWDAF 1665 may collect data from other NF through OAM which configure the 5G system, may analyze the collected data, and may provide a result of the analysis to the other NF.

An NSACF 1680 is an NF that monitors and controls the number of registered UEs and the number of sessions of a network slice that is a target of NSAC. The NSACF 1680 stores configuration information about a maximum number of registered UEs and a maximum number of sessions per network slice.

Hereinafter, for convenience of descriptions, entities that exchange information for access control and state management are collectively referred to as an NF. However, embodiments of the disclosure may be equally applied to a case where NFs are actually implemented as instances (an AMF instance, an SMF instance, an NSSF instance, or the like).

In the disclosure, an instance may indicate that a particular NF exists in the form of software code and is executable by receiving allocation of physical and/or logical resources from a particular computing system so as to perform a function of the NF in the computing system existing in a physical computing system, e.g., a core network. Therefore, AMF Instance, SMF Instance, and NSSF Instance may indicate that the AMF Instance, the SMF Instance, and the NSSF Instance are executable by receiving allocation of physical and/or logical resources for AMF, SMF, and NSSF operations, respectively, from a particular computing system existing over a core network. As a result, physical AMF, SMF, and NSSF entities, and the AMF Instance, the SMF Instance, and the NSSF instance which are allocated and use physical and/or logical resources for AMF, SMF, and NSSF operations from a particular computing system existing over a network may perform same operations. Therefore, in an embodiment of the disclosure, features described for an NF (AMF, SMF, UPF, NSSF, NRF, SCP, or the like) may be replaced by an NF instance, or inversely, features described for an NF instance may be replaced by and applied for an NF. Equally, in an embodiment of the disclosure, features described for a network slice may be replaced by a network slice instance, or inversely, features described for a network slice instance may be replaced by and applied for a network slice.

According to an embodiment of the disclosure, in the 5G system defined in the 3GPP, a single network slice may be referred to as single-network slice selection assistance information (S-NSSAI). The S-NSSAI may consist of a value of a slice/service type (SST) and a value of a slice differentiator (SD). The SST may indicate a feature of a service (e.g., eMBB, IoT, URLLC, V2X, etc.) supported by a slice. The value of the SD may refer to a value to be used as an additional identifier with respect to a particular service indicated by the SST.

NSSAI may include one or more S-NSSAIs. Examples of the NSSAI may include, but are not limited to, Configured NSSAI stored in a UE, requested NSSAI requested by a UE, allowed NSSAI allowed for usage by a UE that is determined by an NF (e.g., an AMF, an NSSF, etc.) of a 5G core network, and subscribed NSSAI to which a UE subscribes.

The UE 1600 may be simultaneously connected to the access network 1610 and thus may be registered in the 5G system. In particular, the UE 1600 may perform a registration procedure with the AMF 1620 by accessing the BS 1610. In the registration procedure, the AMF 1620 may determine and allocate allowed NSSAI to the UE 1600, the allowed NSSAI being usable by the UE 1600 accessing the BS 1610.

Figure 17:
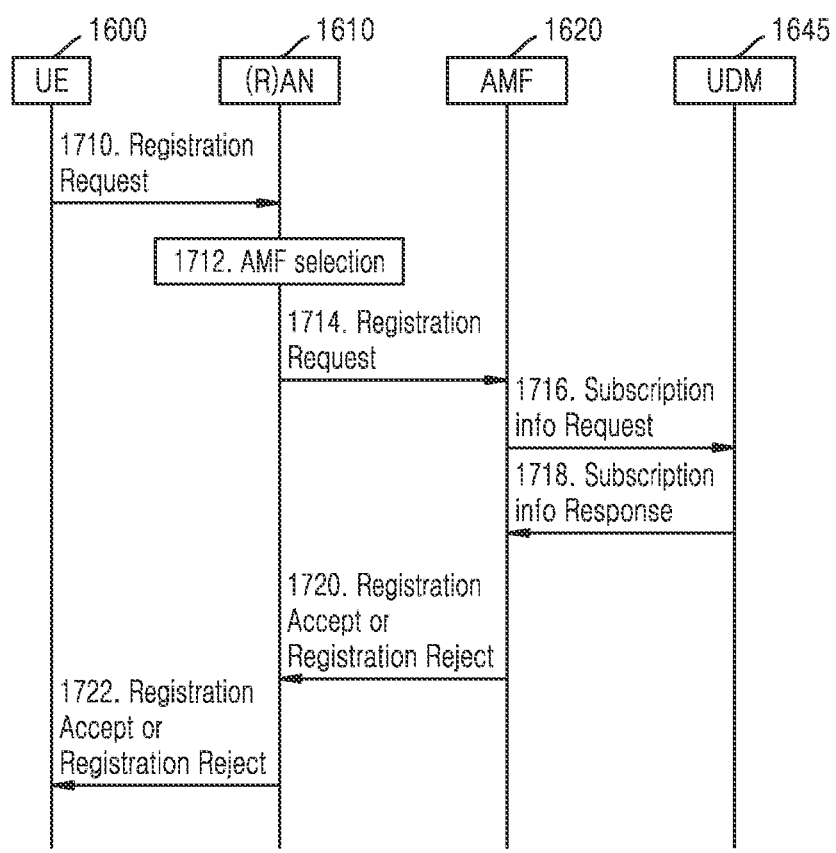
FIG. 17 illustrates a UE registration procedure according to an embodiment of the present disclosure.

FIG. 1 illustrates a UE registration procedure according to an embodiment of the present disclosure. Referring to FIG. 17, the UE 1600 according to an embodiment of the disclosure may perform a registration procedure with the AMF 1620 by accessing the BS 1610.

Operation 1710: The UE 1600 may access the BS 1610 and then may transmit a registration request message. The registration request message may include information about requested NSSAI (e.g., S-NSSAI A) the UE 1600 attempts to use.

Operation 1712: According to an embodiment of the disclosure, when the BS 1610 receives the registration request message, the BS 1610 may select the AMF 1620 to which the registration request is to be transmitted, based on the requested NSSAI received from the UE 1600. For example, the BS 1610 may select the AMF 1620 capable of supporting the requested NSSAI.

Operation 1714: The BS 1610 may transmit the registration request message to the AMF 1620 selected in operation 1712. The AMF 1620 may need to obtain UE subscription information to process the registration request message.

Operation 1716: The AMF 1620 may request the UDM 1645 for the UE subscription information. A UE subscription information request message may include UE ID (e.g. SUPI, 5G-GUTI, or the like).

Operation 1718: The UDM 1645 may transmit, as a response, the UE subscription information corresponding to the UE ID to the AMF 1620. The UE subscription information may include information about slices (subscribed S-NSSAIs) to which the UE 1600 subscribes.

Operation 1720: The AMF 1620 may determine an allowed slice (allowed NSSAI), based on at least one of the requested NSSAI by the UE 1600, subscribed S-NSSAIs of the UE 1600, a 3GPP access network accessed by the UE 1600, a network slice supported by the BS 1610 (S-NSSAI supported by RAN), or an operator policy.

For example, when the requested NSSAI by the UE 1600 (e.g., S-NSSAI A) is included in the subscribed S-NSSAIs of the UE 1600 and is included in the network slice supported by the BS 1610 (S-NSSAI supported by RAN), the AMF 1620 may determine to include the requested NSSAI by the UE 1600 in the allowed slice (e.g., S-NSSAI A).

The AMF 1620 may determine whether S-NSSAI included in the allowed slice is S-NSSAI that is a target of NSAC, based on configuration information stored in the AMF 1620. For example, the configuration information may include information indicating which S-NSSAI is a target of NSAC.

When S-NSSAI included in the allowed slice is S-NSSAI that is a target of NSAC, the AMF 1620 may check slice availability with the NSACF 1680 of the 5G core network before the AMF 1620 determines to allow the allowed slice for the UE 1600. When the number of UEs registered in the S-NSSAI is less than a maximum number of registered UEs, the NSACF 1680 may transmit availability of the slice to the AMF 1620. When availability of the S-NSSAI is received from the NSACF 1680, the AMF 1620 may determine to include the S-NSSAI in the allowed slice.

According to another example, even when S-NSSAI included in the allowed slice is S-NSSAI that is a target of NSAC, based on the operator policy, the AMF 1620 may exempt the NSAC. For example, the AMF 1620 may determine to exempt, from NSAC, S-NSSAI associated with PDN connection (PDU session) handed over from an EPC. The meaning of the exemption of the NSAC is that a procedure for checking slice availability with the NSACF 1680 is not performed (is skipped), and corresponding S-NSSAI is included in the allowed slice. The AMF 1620 may store, as UE context, information indicating that the S-NSSAI is exempted from NSAC. Also, the UE context may include PDU session information (e.g., PDU session ID(s), or the like) that is an exemption target of NSAC. Accordingly, the AMF 1620 may skip a subsequent procedure for checking, with the NSACF 1680, slice availability of corresponding S-NSSAI.

If S-NSSAI requested by the UE 1600 is not included in the allowed slice, the AMF 1620 may include the S-NSSAI in rejected slices (rejected S-NSSAIs).

The AMF 1620 may transmit a registration accept message or a registration reject message to the BS 1610, in response to the registration request message received in operation 1714. The registration accept message may include information about at least one of the allowed slice (allowed NSSAI) or the rejected slice (rejected NSSAI). If there is no slice available for the UE 1600, i.e., if there is no allowed slice, the AMF 1620 may transmit the registration reject message.

Operation 1722: The BS 1610 may transmit, to the UE 1600, the registration accept message or the registration reject message which is received from the AMF 1620. When the UE 1600 receives the registration accept, message, the UE 1600 may store the allowed slice and/or the rejected slice included in the registration accept message. Also, the UE 1600 may establish a PDU session by using the received allowed slice in communication thereafter.

Figure 18:
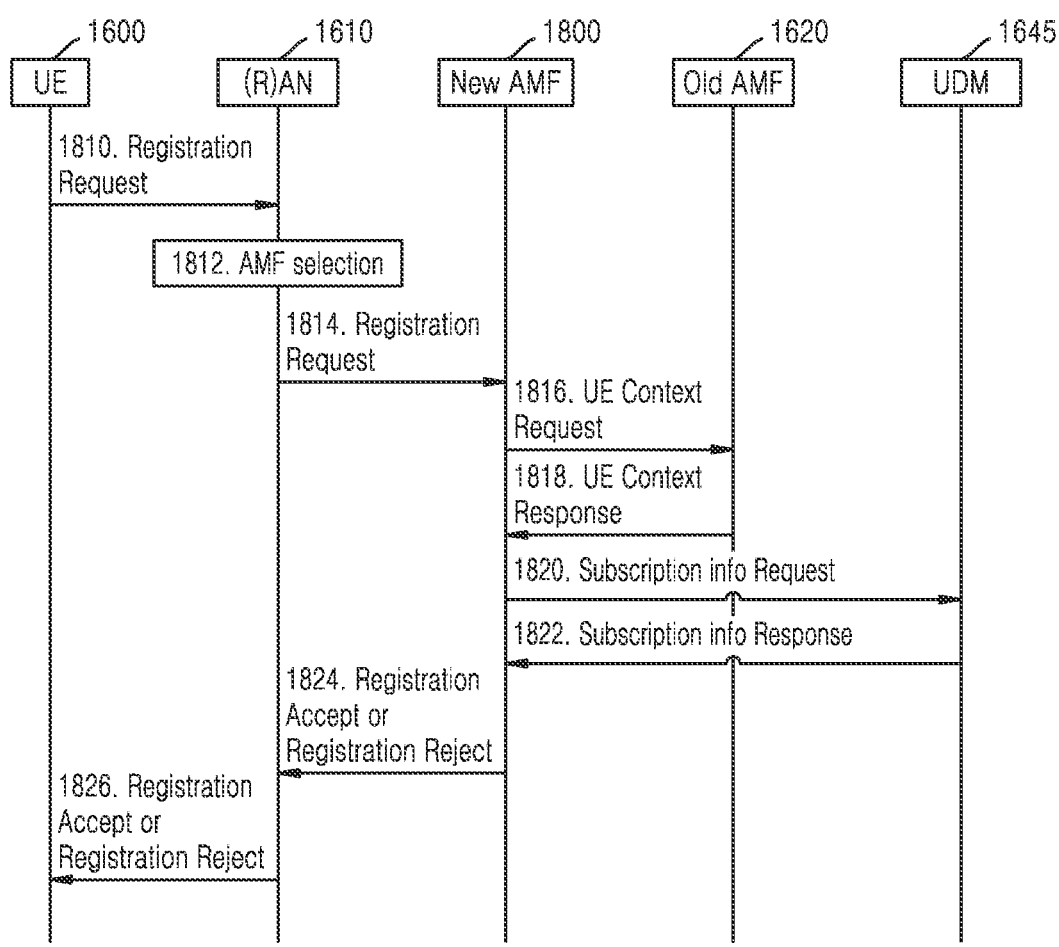
FIG. 18 illustrates a procedure for changing an AMF of a registered UE according to an embodiment of the present disclosure.

FIG. 18 illustrates a procedure for changing an AMF of a registered UE according to an embodiment of the present disclosure.

In operation 1810: The UE 1600 registered in a network via the procedure illustrated in FIG. 17 may transmit a registration request message due to various reasons. For example, the UE 1600 may transmit the registration request message to change a position due to movement of the UE 1600 or to change a slice to be used. The registration request message may include at least one of UE ID (e.g., SUPI, 5G-GUTI, or the like) or requested NSSAI.

In operation 1812: The BS 1610 may select an AMF 1800, based on information received from the UE 1600. Here, the AMF 1800 selected by the BS 1610 may be an AMF different from the AMF 1620 that processes the Registration request by the UE 1600 in FIG. 17.

Operation 1814: The AMF 1800 may process the received registration request message. In order to process the received registration request message, the AMF 1800 may determine to obtain UE context and/or UE subscription information.

Operation 1816: The AMF 1800 may request UE context from the old AMF 1620 that previously serves the UE 1600. A request message may include UE ID.

Operation 1818: The old AMF 1620 may transmit, to the AMF 1800, UE context of the UE 1600 indicated by the UE ID. The UE context transmitted from the old AMF 1620 to the AMF 1800 may include information about S-NSSAI exempted from NSAC. Also, the UE context may include information (e.g., PDU session ID(s), or the like) about PDU session that is an exemption target of NSAC.

Operation 1820: The AMF 1800 may request the UDM 1645 for UE subscription information. A UE subscription information request message may include UE ID (e.g. SUPI, 5G-GUTI, or the like).

Operation 1822: The UDM 1645 may transmit, to the AMF 1800, the UE subscription information corresponding to the UE ID. The UE subscription information may include information about slices (subscribed S-NSSAIs) to which the UE 1600 subscribes.

Operation 1824: The AMF 1800 may determine an allowed slice (allowed NSSAI), based on at least one of requested NSSAI by the UE 1600, subscribed S-NSSAIs of the UE 1600, a 3GPP access network accessed by the UE 1600, a network slice supported by the BS 1610 (S-NSSAI supported by RAN), an operator policy, or the UE context received from the old AMF 1620.

For example, the AMF 1800 may determine whether S-NSSAI included in the allowed slice is S-NSSAI that is a target of NSAC, based on configuration information stored in the AMF 1800. For example, the configuration information may include information indicating which S-NSSAI is a target of NSAC.

When S-NSSAI included in the allowed slice is S-NSSAI that is a target of NSAC, the AMF 1800 may check slice availability with the NSACF 1680 of the 5G core network before the AMF 1800 determines to allow the allowed slice for the UE 1600. When the number of UEs registered in the S-NSSAI is less than a maximum number of registered UEs, the NSACF 1680 may transmit availability of the slice to the AMF 1800. When availability of the S-NSSAI is received from the NSACF 1680, the AMF 1800 may determine to include the S-NSSAI in the allowed slice.

According to another example, even when S-NSSAI included in the allowed slice is S-NSSAI that is a target of NSAC, based on the UE context, the AMF 1800 may exempt the NSAC. For example, when information indicating that the S-NSSAI is exempted from NSAC is included in the UE context, the AMF 1800 may determine to exempt the S-NSSAI from NSAC. Accordingly, the AMF 1800 may not perform (may skip) a procedure for checking slice availability with the NSACF 1680, and may determine to include the corresponding S-NSSAI in the allowed slice.

When the UE context includes information indicating that the S-NSSAI is exempted, the AMF 1800 may store, as UE context, information indicating that the S-NSSAI is exempted from NSAC. Accordingly, the AMF 1800 may skip a subsequent procedure for checking, with the NSACF 1680, slice availability of corresponding S-NSSAI.

If S-NSSAI requested by the UE 1600 is not included in the allowed slice, the AMF 1800 may include the S-NSSAI in rejected slices (rejected S-NSSAIs).

The AMF 1800 may transmit a registration accept message or a registration reject message to the BS 1610, in response to the registration request message received in operation 1814. The registration accept message may include information about at least one of the allowed slice (allowed NSSAI) or the rejected slice (rejected NSSAI). If there is no slice available for the UE 1600, i.e., if there is no allowed slice, the AMF 1800 may transmit the registration reject message.

Operation 1826: The BS 1610 may transmit, to the UE 1600, the registration accept message or the registration reject message received from the AMF 1800. When the UE 1600 receives the registration accept message, the UE 1600 may store the allowed slice and/or the rejected slice included in the registration accept message. Also, the UE 1600 may establish a PDU session by using the received allowed slice in communication thereafter.

Figure 19:
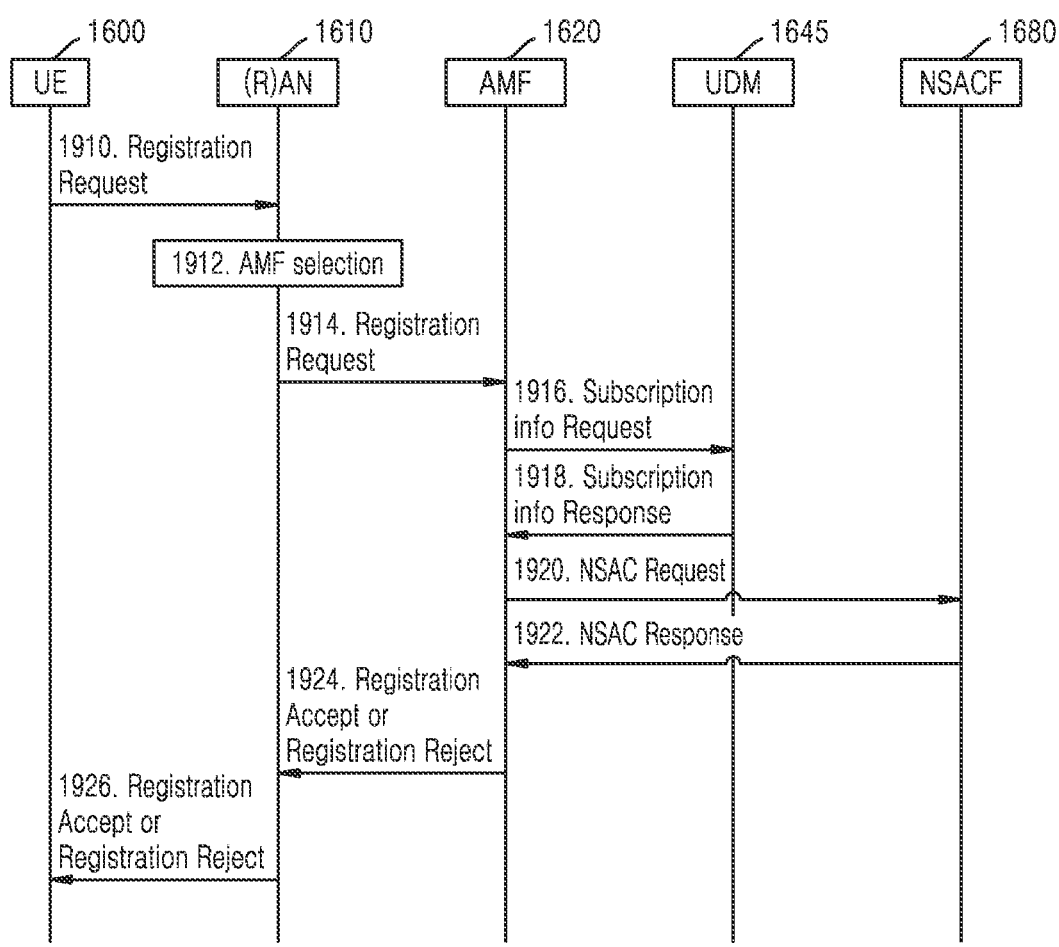
FIG. 19 illustrates a UE registration procedure according to another embodiment of the present disclosure.

FIG. 19 illustrates a UE registration procedure according to another embodiment of the present disclosure.

Operation 1910: The UE 1600 may access the BS 1610 and then may transmit a registration request message. The registration request message may include information about requested NSSAI S-NSSAI A) the UE 1600 attempts to use.

Operation 1912: According to an embodiment of the disclosure, when the BS 1610 receives the registration request message, the BS 1610 may select the AMF 1620 to which the registration request is to be transmitted, based on the requested NSSAI received from the UE 1600. For example, the BS 1610 may select the AMF 1620 capable of supporting the requested NSSAI.

Operation 1914: The BS 1610 may transmit the registration request message to the AMF 1620 selected in operation 1912. The AMF 1620 may need to obtain UE subscription information to process the registration request message.

Operation 1916: The AMF 1620 may request the UDM 1645 for the UE subscription information. A UE subscription information request message may include UE ID (e.g., SUPI, 5G-GUTI, or the like).

Operation 1918: The UDM 1645 may transmit, as a response, the UE subscription information corresponding to the UE ID to the AMF 1620. The UE subscription information may include information about slices (subscribed S-NSSAIs) to which the UE 1600 subscribes.

The AMF 1620 may determine an allowed slice (allowed NSSAI), based on at least one of the requested NSSAI by the UE 1600, subscribed S-NSSAIs of the UE 1600, a 3GPP access network accessed by the UE 1600, a network slice supported by the BS 1610 (S-NSSAI supported by RAN), or an operator policy.

For example, when the requested NSSAI by the UE 1600 (e.g., S-NSSAI A) is included in the subscribed. S-NSSAIs of the UE 1600 and is included in the network slice supported by the BS 1610, the AMF 1620 may determine to include the requested NSSAI by the UE 1600 in the allowed slice (e.g., S-NSSAI A).

The AMF 1620 may determine whether S-NSSAI included in the allowed slice is S-NSSAI that is a target of NSAC, based on configuration information stored in the AMF 1620. For example, the configuration information may include information indicating which S-NSSAI is a target of NSAC.

When S-NSSAI included in the allowed slice is S-NSSAI that is a target of NSAC, the AMF 1620 may check slice availability with the NSACF 880 of the 5G core network before the AMF 1620 determines to allow the allowed slice for the UE 1600. When the number of UEs registered in the S-NSSAI is less than a maximum number of registered UEs, the NSACF 1680 may transmit availability of the slice to the AMF 1620. When availability of the S-NSSAI is received from the NSACF 1680, the AMF 1620 may determine to include the S-NSSAI in the allowed slice.

According to another example, even when S-NSSAI included in the allowed slice is S-NSSAI that is a target of NSAC, based on the operator policy, the AMF 1620 may exempt the NSAC. For example, the AMF 1620 may determine to exempt, from NSAC, S-NSSAI associated with PDN connection handed over from an EPC. The meaning of the exemption of the NSAC is that, in a procedure for checking slice availability with the NSACF 1680, information about the S-NSSAI exempted from NSAC is notified to the NSACF 1680.

Operation 1920: The AMF 1620 may transmit an NSAC request message to the NSACF 1680.

The NSAC request message may include at least one of S-NSSAI information that is a target of NSAC, UE ID, or an indicator indicating an increase or a decrease in a current number of UEs. The NSACF 1680 may process the NSAC request message. For example, when the NSAC request message includes an indicator indicating the number of UEs, the NSACF 1680 may compare a current number of registered UEs with a maximum number of registered UEs, and when the current number of registered UEs does not reach the maximum number of registered UEs, the NSACF 1680 may increase the current number of registered UEs which corresponds to S-NSSAI and is stored/managed by the NSACF 1680. Also, the NSACF 1680 may store UE ID registered in the S-NSSAI. If the NSACF 1680 compares the current number of registered UEs with the maximum number of registered UEs, and when the current number of registered UEs does reaches the maximum number of registered. UEs (or the current number of registered UEs exceeds the maximum number of registered UEs), the NSACF 1680 may determine that an increase in the current number of registered UEs is no more available. That is, in this case, the NSACF 1680 may not be able to successfully process the request received from the AMF 1620.

According to another embodiment of the disclosure, the NSAC request message may include information about S-NSSAI that is a target of NSAC (or information about S-NSSAI exempted from a target of NSAC), UE ID, or an indicator indicating NSAC exemption. The NSACF 1680 may process the NSAC request message. For example, as the S-NSSAI included in the NSAC request message is exempted from the NSAC, the NSACF 1680 may not change the current number of registered UEs which corresponds to the S-NSSAI. Also, the NSACF 1680 may store UE ID for the S-NSSAI exempted from the NSAC.

Operation 1922: The NSACF 1680 may transmit an NSAC response message to the AMF 1620. The NSAC response message may include information indicating a result of processing the NSAC request message in operation 1920. The NSAC response message may include at least one of information about an NSAC-target slice (e.g., S-NSSAI, requested NSSAI, allowed NSSAI, subscribed S-NSSAI, or the like) or availability of the NSAC-target slice (e.g., indication indicating availability or not-availability, a cause value, or the like). For example, when a request of S-NSSAI exempted from NSAC is processed, the NSACF 1680 may include information indicating that a slice is available. Alternatively, the NSACF 1680 may include information indicating that the S-NSSAI is exempted from NSAC. Alternatively, when the current number of registered UEs exceeds the maximum number of registered UEs and thus an increase in the current number of registered UEs is no longer available, the NSAC response message may include information indicating that the slice is not available.

Operation 1924: The AMF 1620 may determine the allowed slice, according to the slice availability received from the NSACF 1680. For example, when the information indicating that the slice (S-NSSAI) is available or the information indicating that the S-NSSAI is exempted is received from the NSACF 1680, the AMF 1620 may include the slice (S-NSSAI) in the allowed slice. Alternatively, for example, when not-availability of the slice (S-NSSAI) is received from the NSACF 1680, the AMF 1620 may not include the slice (S-NSSAI) in the allowed slice. In addition, the AMF 1620 may include the slice (S-NSSAI) in a rejected slice (rejected NSSAI). Alternatively, for example, when the NSACF 1680 transmits the information indicating that the slice (S-NSSAI) that has been determined to be exempted from NSAC is not available (has failed), the AMF 1620 may determine to ignore a response (non-availability of the slice) received from the NSACF 1680 as the AMF 1620 determined to exempt NSAC even when the slice is not available. That is, as the AMF 1620 determined to exempt NSAC even when the slice is not available, the AMF 1620 may include the slice (S-NSSAI) in the allowed slice. The AMF 1620 may store, as UE context, information indicating that the S-NSSAI is not available but is stored in the allowed slice. Also, the UE context may include PDU session information (e.g., PDU session ID(s), or the like) that is an exemption target of NSAC.

When the information indicating that the S-NSSAI is exempted is received from the NSACF 1680, the AMF 1620 may store, as UE context, the information indicating that the S-NSSAI is exempted from NSAC. Also, the UE context may include PDU session information (e.g., PDU session ID(s), or the like) that is an exemption target of NSAC. Accordingly, the AMF 1620 may skip a subsequent procedure for checking, with the NSACF 1680, slice availability of corresponding S-NSSAI.

The AMF 1620 may transmit a registration accept message or a registration reject message to the BS 1610, in response to the registration request message received in operation 1914. The registration accept message may include information about at least one of the allowed slice (allowed N SSAI) or the rejected slice (rejected NSSAI). If there is no slice available for the UE 1600, i.e., if there is no allowed slice, the AMF 1620 may transmit the registration reject message. If the AMF 1620 receives, from the NSACF 1680, information indicating that the slice (S-NSSAI) that has been determined to be exempted from NSAC is not available (has failed), but determines that the corresponding slice is exempted from NSAC even when the corresponding slice is not available, the AMF 1620 may include the slice (S-NSSAI) in the allowed slice, and may include, in the registration accept message, information indicating that the S-NSSAI is included in the allowed slice even when the S-NSSAI is not available. For example, the registration accept message may include slice information (S-NSSAI), an indicator indicating availability only for a current established PDU session associated with the slice, an indicator (e.g., PDU session ID(s), or the like) indicating an available PDU session (i.e., a current established PDU session) associated with the slice, or the like.

Operation 1926: The BS 1610 may transmit, to the UE 1600, the registration accept message or the registration reject message which is received from the AMF 1620. When the UE 1600 receives the registration accept message, the UE 1600 may store the allowed slice and/or the rejected slice included in the registration accept message. Also, the UE 1600 may establish a PDU session by using the received allowed slice in communication thereafter. If the registration accept message includes the slice information (S-NSSAI), the indicator indicating availability only for a current established PDU session associated with the slice, the indicator (e.g., PDU session ID(s), or the like) indicating an available PDU session (i.e., a current established PDU session) associated with the slice, or the like, the UE 1600 may not additionally request a PDU session associated with the slice corresponding thereto.

Figure 20:
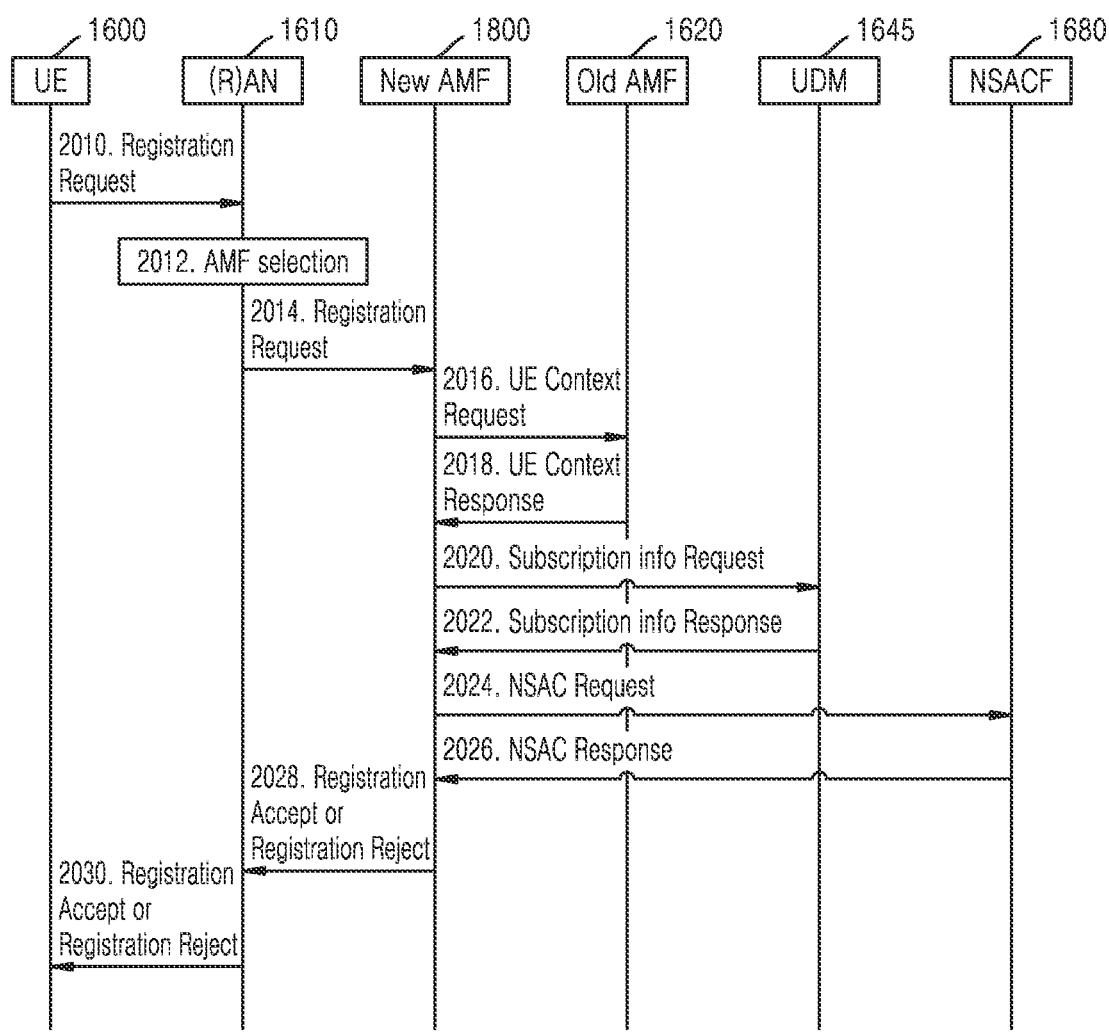
FIG. 20 illustrates a procedure for changing an AMF of a registered UE according to another embodiment of the present disclosure.

FIG. 20 illustrates a procedure for changing an AMF of a registered UE according to another embodiment of the present disclosure.

In operation 2010: The UE 1600 registered in a network via the procedure illustrated in FIG. 19 may transmit a registration request message due to various reasons. For example, the UE 1600 may transmit the registration request message to change a position due to movement of the UE 1600 or to change a slice to be used. The registration request message may include at least one of UE ID (e.g., SUPI, 5G-GUTI, or the like) or requested NSSAI.

In operation 2012: The BS 1610 may select an AMF 1800, based on information received from the UE 1600. Here, the AMF 1800 selected by the BS 1610 may be an AMF different from the AMF 1620 that processes the registration request by the UE 1600 in FIG. 19.

Operation 2014: The AMF 1800 may process the received registration request message. In order to process the received registration request message, the AMF 1800 may determine to obtain UE context and/or UE subscription information.

Operation 2016: The AMF 1800 may request UE context from the old AMF 1620 that previously serves the UE 1600. A request message may include UE ID.

Operation 2018: The old AMF 1620 may transmit, to the AMF 1800, UE context of the UE 1600 indicated by the UE ID. When the old AMF 1620 includes a slice (S-NSSAI) in an allowed slice even when the slice is not available, UE context may include information indicating that the S-NSSAI is include in the allowed slice even when the S-NSSAI is not available. Also, the UE context may include information (e.g., PDU session ID(s), or the like) about PDU session that is an exemption target of NSAC.

Operation 2020: The AMF 1800 may request the UDM 1645 for UE subscription information. A UE subscription information request message may include UE ID (e.g., SUPI, 5G-GUTI, or the like).

Operation 2022: The UDM 1645 may transmit, to the AMF 1800, the UE subscription information corresponding to the UE ID. The UE subscription information may include information about slices (subscribed S-NSSAIs) to which the UE 1600 subscribes.

Operation 2024: The AMF 1800 may determine an allowed slice (allowed NSSAI), based on at least one of requested. NSSAI by the UE 1600, subscribed S-NSSAIs of the UE 1600, a 3GPP access network accessed by the UE 1600, a network slice supported by the BS 1610 (S-NSSAI supported by RAN), an operator policy, or the UE context received from the old AMF 1620.

For example, the AMF 1800 may determine whether S-NSSAI included in the allowed slice is S-NSSAI that is a target of NSAC, based on configuration information stored in the AMF 1800. For example, the configuration information may include information indicating which S-NSSAI is a target of NSAC.

When S-NSSAI included in the allowed slice is S-NSSAI that is a target of NSAC, the AMF 1800 may check slice availability with the NSACF 1680 of the 5G core network before the AMF 1800 determines to allow the allowed slice for the UE 1600.

In order to check the slice availability, the AMF 1800 may transmit an NSAC request message to the NSACF 1680. The NSAC request message may include at least one of S-NSSAI information that is a target of NSAC, UE ID, or an indicator indicating an increase or a decrease in a current number of UEs. The NSACF 1680 may process the NSAC request message. For example, the NSACF 1680 may check information associated with UE ID included in the NSAC request message, the UE ID being among UE IDs stored in the NSACF 1680. If S-NSSAI information exempted from NSAC is stored with respect to the received UE ID, and the stored S-NSSAI information exempted from NSAC is equal to the received S-NSSAI, the NSACF 1680 may identify that the S-NSSAI included in the NSAC request message is a slice exempted from NSAC. Accordingly, as the S-NSSAI included in the NSAC request message is exempted from NSAC, the NSACF 1680 may not change the current number of registered UEs which corresponds to the S-NSSAI.

Operation 2026: The NSACF 1680 may transmit an NSAC response message to the AMF 1800. The NSAC response message may include information indicating a result of processing the NSAC request message in operation 1920. The NSAC response message may include at least one of information about an NSAC-target slice (e.g., S-NSSAI, requested NSSAI, allowed NSSAI, subscribed S-NSSAI, or the like) or availability of the NSAC-target slice (e.g., indication indicating availability or not-availability, a cause value, or the like). For example, when a request of S-NSSAI exempted from NSAC is processed, the NSACF 1680 may include information indicating that a slice is available. Alternatively, the NSACF 1680 may include information indicating that the S-NSSAI is exempted from NSAC. Alternatively, when the current number of registered UEs exceeds the maximum number of registered UEs and thus an increase in the current number of registered UEs is no longer available, the NSAC response message may include information indicating that the slice is not available.

Operation 2028: The AMF 1800 may determine the allowed slice, according to the slice availability received from the NSACF 1680. For example, when the information indicating that the slice (S-NSSAI) is available or the information indicating that the S-NSSAI is exempted is received from the NSACF 1680, the AMF 1800 may include the slice (S-NSSAI) in the allowed slice. If UE context includes information indicating that S-NSSAI is included in the allowed slice even when the S-NSSAI is not available and/or PDU session information (e.g., PDU session ID(s), or the like) that is an exemption target of NSAC, the AMF 1800 may delete the information from the UE context.

Alternatively, for example, when not-availability of the slice (S-NSSAI) is received from the NSACF 1680, the AMF 1800 may not include the slice (S-NSSAI) in the allowed slice. In addition, the AMF 1800 may include the slice (S-NSSAI) in a rejected slice (rejected NSSAI). If the UE context includes the information indicating that the S-NSSAI is included in the allowed slice even when the S-NSSAI is not available, the AMF 1800 may determine to ignore a response (non-availability of the slice) received from the NSACF 1680. That is, the AMF 1800 may include the slice (S-NSSAI) in the allowed slice. Also, the AMF 1800 may changelessly maintain the information indicating that the S-NSSAI is included in the allowed slice even when the S-NSSAI is not available.

When the information indicating that the S-NSSAI is exempted is received from the NSACF 1680, the AMF 1800 may store, as UE context, the information indicating that the S-NSSAI is exempted from NSAC. Also, the UE context may include PDU session information (e.g., PDU session ID(s), or the like) that is an exemption target of NSAC. Accordingly, the AMF 1800 may skip a subsequent procedure for checking, with the NSACF 1680, slice availability of corresponding S-NSSAI.

The AMF 1800 may transmit a registration accept message or a registration reject message to the BS 1610, in response to the registration request message received in operation 2014. The registration accept message may include information about at least one of the allowed slice (allowed NSSAI) or the rejected slice (rejected NSSAI). If there is no slice available for the UE 1600, i.e., if there is no allowed slice, the AMF 1800 may transmit the registration reject message.

Operation 2030: The BS 1610 may transmit, to the UE 1600, the registration accept message or the registration reject message received from the AMF 1800. When the UE 1600 receives the registration accept message, the UE 1600 may store the allowed slice and/or the rejected slice included in the registration accept message. Also, the UE 1600 may establish a PDU session by using the received allowed slice in communication thereafter.

In operation thereafter, the UE 1600 may release a PDU session that is an exemption target of NSAC. When all PDU sessions that are an exemption target of NSAC, which are stored as UE context, are released, the AMF 1800 may delete, from the UE context, the information indicating that S-NSSAI is included in the allowed slice even when the S-NSSAI is not available and/or the PDU session information e.g., PDU session ID(s), or the like) that is an exemption target of NSAC.

Figure 21:
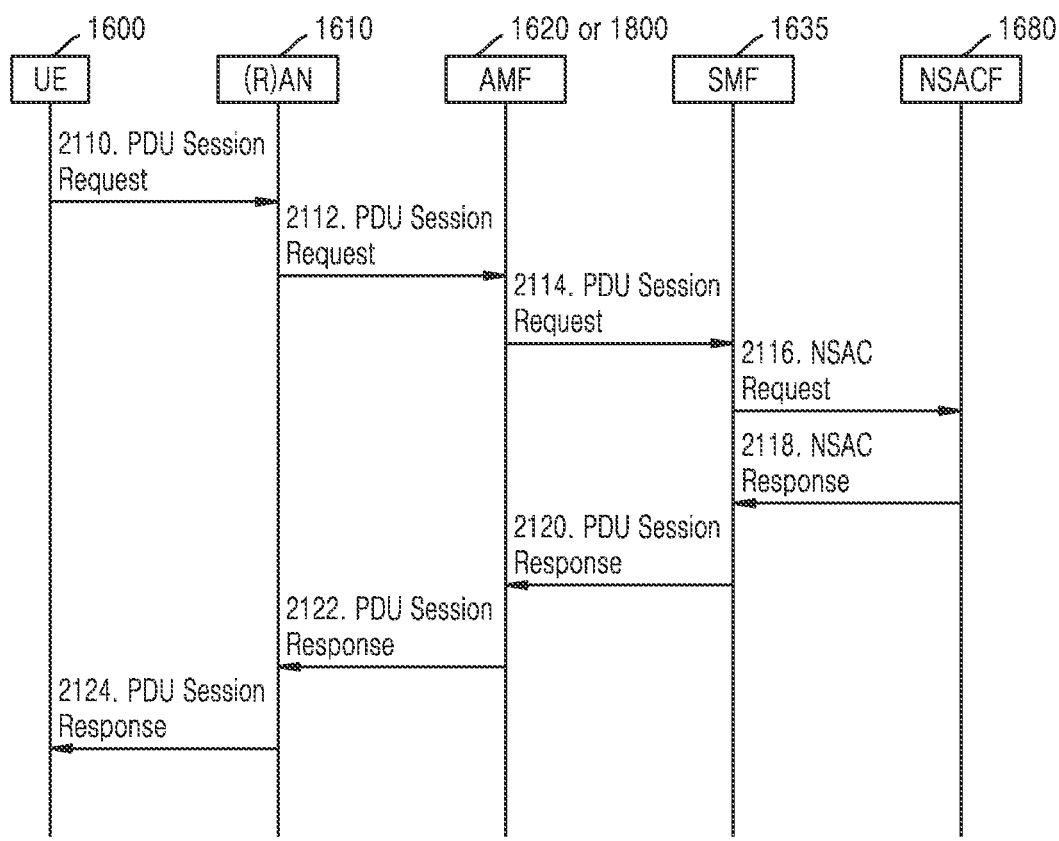
FIG. 21 illustrates a procedure for establishing a PDU session according to an embodiment of the present disclosure.

FIG. 21 illustrates a PDU session establishment procedure according to an embodiment of the present disclosure.

Operation 2110: A UE 2100 registered in a network via a procedure illustrated in FIGS. 17 to 20 may access a BS 2110 and may transmit a PDU session request message. The PDU session request message may include a slice (e.g. S-NSSAI A) the UE 2100 attempts to use. The slice may be one of S-NSSAIs included in an allowed slice. Also, the PDU session request message may include indicator information (e.g., PDU session ID, or the like) indicating a PDU session.

Operation 2112: According to an embodiment of the disclosure, the BS 2110 having received the PDU session request message may transmit a PDU session request to the AMF 1620 or 1800 that serves the UE 2100.

According to various embodiments described in the disclosure, the AMF 1620 or 1800 may determine whether S-NSSAI requested by the UE 2100 is S-NSSAI that is a target of NSAC.

Also, even when the S-NSSAI requested by the UE 2100 is S-NSSAI that is a target of NSAC, the AMF 1620 or 1800 may determine to exempt the NSAC. For example, even when the S-NSSAI requested by the UE 2100 is S-NSSAI that is a target of NSAC, based on an operator policy, the AMF 1620 or 1800 may determine to exempt the NSAC. Alternatively, even when the S-NSSAI requested by the UE 2100 is S-NSSAI that is a target of NSAC, if UE context stored in the AMF 1620 or 1800 includes information indicating that the corresponding S-NSSAI is exempted from NSAC, the AMF 1620 or 1800 may determine to exempt the NSAC. The AMF 1620 or 1800 may store, as UE context, information indicating that the corresponding S-NSSAI is exempted from NSAC.

Also, the AMF 1620 or 1800 may check whether the PDU session requested by the UE 2100 is a PDU session that is an exemption target of NSAC. For example, the AMF 1620 or 1800 may determine to exempt, from NSAC, PDN connection (PDU session) handed over from an EPC, and may store, as UE context, PDU session information (e.g., PDU session ID(s), or the like) that is the exemption target of NSAC. The AMF 1620 or 1800 may compare PDU session information (e.g., PDU session ID(s), or the like) that is the exemption target of NSAC and is stored as the UE context, with the indicator information (e.g., PDU session ID, or the like) indicating a PDU session which is included in the PDU session request message, thereby checking whether the PDU session requested by the UE 2100 is a PDU session that is an exemption target of NSAC. That is, the indicator information (e.g., PDU session ID, or the like) indicating a PDU session which is included in the PDU session request message is included in the PDU session information (e.g., PDU session ID(s), or the like) that is the exemption target of NSAC and is stored as the UE context, the AMF 1620 or 1800 may determine that the PDU session requested by the UE 2100 is the PDU session exempted from NSAC.

The AMF 1620 or 1800 may determine whether to accept establishment of the PDU session requested by the 2100, based on the operator policy. For example, when S-NSSAI that is included in the PDU session request message and is requested by the UE 2100 is an exemption target of NSAC or PDU session ID included in the PDU session request message is an exemption target of NSAC, the AMF 1620 or 1800 may determine to perform a PDU session establishment procedure. Accordingly, the AMF 1620 or 1800 may perform operation 2114.

Operation 2114: The AMF 1620 or 1800 may transmit a PDU session request message to the SMF 1635. The PDU session request message may include the S-NSSAI requested by the UE 2100. If the S-NSSAI requested by the UE 2100 is exempted from NSAC, the PDU session request message may include information (indicator) indicating that the S-NSSAI is exempted from NSAC.

The SMF 1635 having received the PDU session request message from the AMF 1620 or 1800 may determine whether the received S-NSSAI is a target of NSAC. If the received S-NSSAI is a target of NSAC, the SMF 1635 may perform operations 2116 to 2118, thereby checking slice availability with the NSACF 1680. If the received S-NSSAI is exempted from NSAC, the SMF 1635 may skip a procedure for checking slice availability with the NSACF 1680, i.e., operations 2116 to 2118.

Operation 2116: When the received S-NSSAI is a target of NSAC, the SMF 1635 may transmit an NSAC request message to the NSACF 1680. The NSAC request message may include at least one of information about the S-NSSAI that is a target of NSAC, UE ID, PDU session ID, or an indicator indicating an increase or a decrease in a current number of UEs. The NSACF 1680 may process the NSAC request message. For example, when an indicator indicating an increase in the number of sessions is included in the NSAC request message, the NSACF 1680 may increase a current number of sessions corresponding to S-NSSAI stored/managed by the NSACF 1680. Also, the NSACF 1680 may store UE ID and/or PDU session ID registered in S-NSSAI.

Operation 2118: The NSACF 1680 may transmit an NSAC response message to the SMF 1635. The NSAC response message may include information indicating a result of processing the NSAC request message in operation 2116. For example, when the current number of sessions is increased in response to the request by the SMF 1635, the NSACF 1680 may include information indicating that a slice is available.

Operation 2120: When the S-NSSAI requested by the UE 2100 is exempted from NSAC in operation 2114 or based on the result of processing the NSAC request message received from the NSACF 1680 in operation 2118, the SMF 1635 may process a PDU session request. For example, when the S-NSSAI requested by the UE 2100 is exempted from NSAC in operation 2114 or when the information indicating that a slice is available is received from the NSACF 1680 in operation 2118, the SMF 1635 may determine to allow establishment of a PDU session to the corresponding S-NSSAI. The SMF 1635 may transmit a PDU session response message to the AMF 1620 or 1800.

Operation 2122: The AMF 1620 or 1800 may transmit the PDU session response message to the UE 2100 via the BS 2110.

Operation 2124: The BS 2110 may transmit, to the UE 2100, the PDU session response message received from the AMF 1620 or 1800. The UE 2100 having received the PDU session response message may transmit and receive data by using the PDU session established in association with the S-NSSAI.

Figure 22:
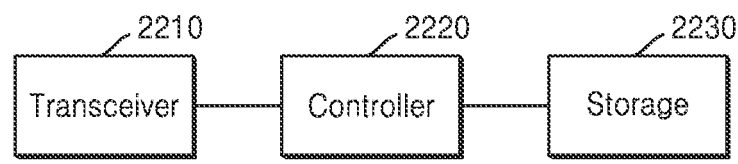
FIG. 22 illustrates a structure of a UE according to an embodiment of the disclosure.

FIG. 22 illustrates a structure of a UE according to an embodiment of the present disclosure.

Referring to FIG. 22, the UE may include a transceiver 2210, a controller 2220, and a storage 2230. In the disclosure, the controller 2220 may be defined as a circuit, an application-specific integrated circuit or at least one processor.

The transceiver 2210 may transmit and receive signals to and from another network entity. For example, the transceiver 2210 may receive system information and may receive a synchronization signal or a reference signal, from a BS.

The controller 2220 may control general operations of the UE according to embodiments provided in the disclosure. For example, the controller 2220 may control a signal flow between blocks so as to perform operations according to flowcharts described above.

The storage 2230 may store at least one of information transmitted/received via the transceiver 2210 or information generated by the controller 2220.

Figure 23:
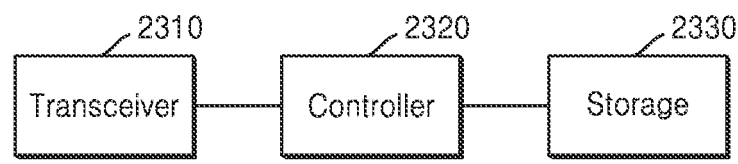
FIG. 23 illustrates a structure of a network entity according to an embodiment of the present disclosure.

FIG. 23 illustrates a structure of a network entity according to an embodiment of the present disclosure.

Referring to FIG. 23, the network entity may include a transceiver 2310, a, controller 2320, and a storage 2330. In the disclosure, the controller 2320 may be defined as a circuit, an application-specific integrated circuit or at least one processor.

The transceiver 2310 may transmit and receive signals to and from another network entity.

The controller 2320 may control general operations of the network entity according to embodiments provided in the disclosure. For example, the controller 2320 may control a signal flow between blocks so as to perform operations according to flowcharts described above.

The storage 2330 may store at least one of information transmitted/received via the transceiver 2310 or information generated by the controller 2320.

Figure 24:
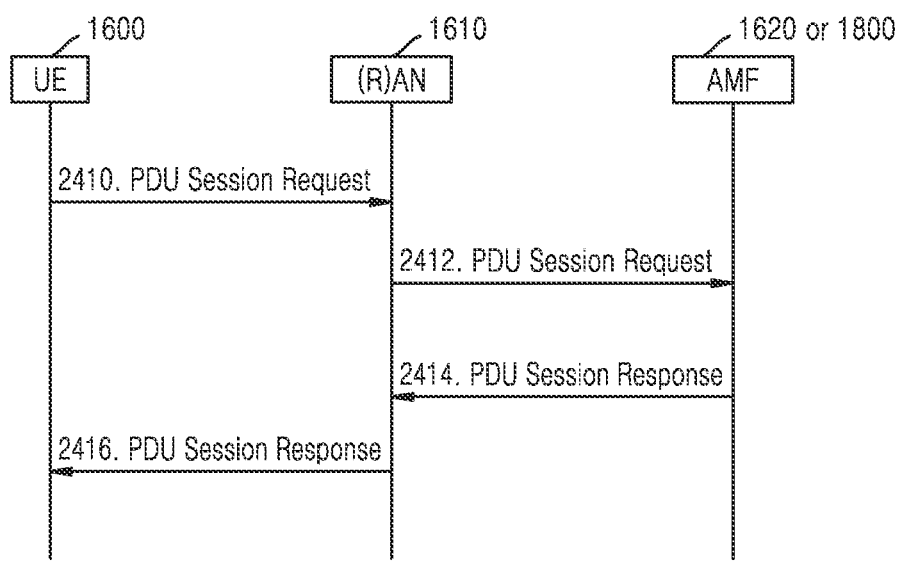
FIG. 24 illustrates a procedure for establishing a PDU session according to an embodiment of the present disclosure.

FIG. 24 illustrates a procedure for establishing a PDU session according to an embodiment of the present disclosure.

Operation 2410: The UE 2100 registered in a network via a procedure illustrated in FIGS. 17 to 20 may access the BS 2110 and may transmit a PDU session request message. The PDU session request message may include a slice (e.g., S-NSSAI A) the UE 2100 attempts to use. The slice may be one of S-NSSAIs included in an allowed slice. Also, the PDU session request message may include indicator information (e.g., PDU session ID, or the like) indicating a PDU session.

Operation 2412: According to an embodiment of the disclosure, the BS 2110 having received the PDU session request message may transmit a PDU session request to the AMF 1620 or 1800 that serves the UE 2100.

According to various embodiments described in the disclosure, the AMF 1620 or 1800 may determine whether S-NSSAI requested by the UE 2100 is S-NSSAI that is a target of NSAC. For example, even when the S-NSSAI requested by the UE 2100 is S-NSSAI that is a target of NSAC, based on an operator policy, the AMF 1620 or 1800 may determine that the S-NSSAI is S-NSSAI that is an exemption target of NSAC. Alternatively, even when the S-NSSAI requested by the UE 2100 is S-NSSAI that is a target of NSAC, if UE context stored in the AMF 1620 or 1800 includes information indicating that the corresponding S-NSSAI is exempted from NSAC, the AMF 1620 or 1800 may determine that the S-NSSAI is S-NSSAI that is an exemption target of NSAC even when the S-NSSAI requested by the UE 2100 is S-NSSAI that is a target of NSAC. The AMF 1620 or 1800 may store, as UE context, information indicating that the corresponding S-NSSAI is exempted from NSAC.

Also, the AMF 1620 or 1800 may check whether the PDU session requested by the UE 2100 is a PDU session that is an exemption target of NSAC. For example, the AMF 1620 or 1800 may determine to exempt, from NSAC, PDN connection (PDU session) handed over from an EPC, and may store, as UE context, PDU session information (e.g., PDU session ID(s), or the like) that is the exemption target of NSAC. The AMF 1620 or 1800 may compare PDU session information (e.g., PDU session ID(s), or the like) that is the exemption target of NSAC and is stored as the UE context, with the indicator information (e.g., PDU session ID, or the like) indicating a PDU session which is included in the PDU session request message, thereby checking whether the PDU session requested by the UE 2100 is a PDU session that is an exemption target of NSAC. That is, the indicator information (e.g., PDU session ID, or the like) indicating a PDU session which is included in the PDU session request message is not included in the PDU session information (e.g., PDU session ID(s), or the like) that is the exemption target of NSAC and is stored as the UE context, the AMF 1620 or 1800 may determine that the PDU session requested by the UE 2100 is not the session exempted from NSAC.

The AMF 1620 or 1800 may determine whether to accept establishment of the PDU session requested by the UE 2100, based on the operator policy. For example, when S-NSSAI that is included in the PDU session request message and is requested by the UE 2100 is an exemption target of NSAC but PDU session ED included in the PDU session request message is not an exemption target of NSAC, the AMF 1620 or 1800 may determine to reject a PDU session establishment request.

Operation 2414: The AMF 1620 or 1800 may transmit a PDU session response message to the UE 2100 via the BS 2110. When it is determined to reject the PDU session establishment request in operation 2412, the AMF 1620 or 1800 may transmit information indicating rejection of PDU session establishment, e.g., a PDU session establishment reject message, as the PDU session response message to the UE 2100. The PDU session response message may include a cause value indicating why session establishment is rejected.

Operation 2416: The BS 2110 may transmit, to the UE 2100, the PDU session response message received from the AMF 1620 or 1800. When the PDU session establishment reject message is received as the PDU session response message, the UE 2100 may identify that the PDU session establishment request by the UE 2100 is rejected.

The methods according to the embodiments of the disclosure described in the claims or the detailed description may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to cause the electronic device to execute the methods according to the embodiments of the disclosure described in the claims or the detailed description.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory including a combination of some or all of the above-mentioned memory devices. In addition, each memory may refer to a plurality of memories.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to a device according to the embodiments of the disclosure. Another storage device on the communication network may also be connected to the device performing the embodiments of the disclosure.

According to the disclosure, a network slice update procedure is provided, such that a wireless communication system may effectively manage network slices registered in a UE and may support various services via the network slice.

In the afore-described embodiments of the disclosure, elements included in the disclosure are expressed in a singular or plural form according to the embodiments. However, the singular or plural form is appropriately selected for convenience of descriptions and the disclosure is not limited thereto. As such, an element expressed in a plural form may also be configured as a single element, and an element expressed in a singular form may also be configured as plural elements.

Specific embodiments of the disclosure are described in the descriptions of the disclosure, but it will be understood that various modifications may be made without departing the scope of the disclosure. Thus, the scope of the disclosure is not limited to the embodiments described herein and should be defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an access and mobility management function (AMF) of a 5G core network (5GC) in a wireless communication system, the method comprising:
   receiving a registration request of a user equipment (UE) for one or more single network slice selection assistance informations (S-NSSAIs);
   in case that a packet data networks (PDN) connection of the UE established in an evolved packet core network (EPC) is handed over to the 5GC, identifying a protocol data unit PDU) session identity (ID) and S-NSSAI associated with the PDN connection based on the registration request of the UE; and
   transmitting, to a session management function (SMF), a PDU session request message including the S-NSSAI and information regarding skipping of a slice availability check for counting a number of PDU sessions,
   wherein the number of PDU sessions is not counted based on the information regarding the skipping of the slice availability check.

2. The method of claim 1, further comprising:
   transmitting, to a network slice admission control function (NSACF), a request message for a slice availability check including information regarding an access type of the UE, based on the registration request of the UE,
   wherein the slice availability check is performed based on the access type of the UE.

3. The method of claim 2, wherein in case that the access type of the UE is not configured for a network slice admission control (NSAC), the request message from the AMF is accepted without increasing or decreasing a number of UEs registered for each of the one or more S-NSSAIs, and
   wherein in case that the access type of the UE is configured for the NSAC and the number of UEs registered for each of the one or more S-NSSAIs reaches to a maximum number for each of the one or more S-NSSAIs, a response message to reject registration is transmitted to the AMF.

4. The method of claim 2, wherein the access type includes at least one of 3GPP access or non-3GPP access.

5. An access and mobility management function (AMF) of a 5G core network (5GC) in a wireless communication system, the AMF comprising:
   a transceiver; and
   at least one processor coupled with the transceiver and configured to:
      receive a registration request of a user equipment (UE) for one or more single network slice selection assistance informations (S-NSSAIs),
      in case that a packet data networks (PDN) connection of the UE established in an evolved packet core network (EPC) is handed over to the 5GC, identify a protocol data unit (PDU) session identity (ID) and S-NSSAI associated with the PDN connection based on the registration request of the UE, and
      transmit, to a session management function (SMF), a PDU session request message including the S-NSSAI and information regarding skipping of a slice availability check for counting a number of PDU sessions,
      wherein the number of PDU sessions is not counted based on the information regarding the skipping of the slice availability check.

6. The AMF of claim 5, wherein the at least one processor is further configured to:
   transmit, to a network slice admission control function (NSACF), a request message for a slice availability check including information regarding an access type of the UE, based on the registration request of the UE, and
   wherein the slice availability check is performed based on the access type of the UE.

7. The AMF of claim 6, wherein in case that the access type of the UE is not configured for a network slice admission control (NSAC), the request message from the AMF is accepted without increasing or decreasing a number of UEs registered for each of the one or more S-NSSAIs, and
   wherein in case that the access type of the UE is configured for the NSAC and the number of UEs registered for each of the one or more S-NSSAIs reaches to a maximum number for each of the one or more S-NSSAIs, a response message to reject registration is transmitted to the AMF.

8. The AMF of claim 6, wherein the access type includes at least one of 3GPP access or non-3GPP access.

9. A method performed by a session management function (SMF) of a 5G core network (5GC) in a wireless communication system, the method comprising:
   receiving, from an access and mobility management function (AMF), a protocol data unit (PDU) session request message including single network slice selection assistance information (S-NSSAI); and
   based on the PDU session request message further including information regarding skipping of a slice availability check for counting a number of PDU sessions, skipping the slice availability check for the S-NSSAI,
   wherein the information regarding the skipping of the slice availability check is included in the PDU session request message, in case that the S-NSSAI is associated with a packet data networks (PDN) connection of a user equipment (UE) established in an evolved packet core network (EPC) and the PDN connection is handed over from the EPC to the 5GC, and
   wherein a number of PDU sessions is not counted based on the information regarding the skipping of the slice availability check.

10. A session management function (SMF) of a 5G core network (5GC) in a wireless communication system, the SMF comprising:
    a transceiver; and
    at least one processor coupled with the transceiver and configured to:
       receive, from an access and mobility management function (AMF), a protocol data unit (PDU) session request message including single network slice selection assistance information (S-NSSAI), and
       based on the PDU session request message further including information regarding skipping of a slice availability check for counting a number of PDU sessions, skip the slice availability check for the S-NSSAI,
    wherein the information regarding the skipping of the slice availability check is included in the PDU session request message, in case that the S-NSSAI is associated with a packet data networks (PDN) connection of a user equipment (UE) established in an evolved packet core network (EPC) and the PDN connection is handed over from the EPC to the 5GC, and wherein a number of PDU sessions is not counted based on the information regarding the skipping of the slice availability check.

\* \* \* \* \*